(12) United States Patent
Hwang et al.

(10) Patent No.: US 10,971,756 B2
(45) Date of Patent: Apr. 6, 2021

(54) POLYMER ELECTROLYTE, POLYMER, ELECTROCHEMICAL DEVICE, AND METHOD OF PREPARING THE POLYMER

(71) Applicants: Samsung Electronics Co., Ltd., Suwon-si (KR); Samsung SDI Co., Ltd., Yongin-si (KR)

(72) Inventors: Seungsik Hwang, Seongnam-si (KR); Soyeon Kim, Suwon-si (KR); Jaeeun Kim, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 138 days.

(21) Appl. No.: 16/158,351

(22) Filed: Oct. 12, 2018

(65) Prior Publication Data

US 2019/0214678 A1 Jul. 11, 2019

(30) Foreign Application Priority Data

Jan. 8, 2018 (KR) .................. 10-2018-0002293

(51) Int. Cl.
*H01M 10/0565* (2010.01)
*H01M 10/0525* (2010.01)
(Continued)

(52) U.S. Cl.
CPC ....... *H01M 10/0565* (2013.01); *C08F 220/28* (2013.01); *C08G 61/04* (2013.01);
(Continued)

(58) Field of Classification Search
None
See application file for complete search history.

(56) References Cited

U.S. PATENT DOCUMENTS

| 6,322,924 B1 | 11/2001 | Hirahara et al. |
| 2013/0295466 A1 | 11/2013 | Kwon et al. |

(Continued)

FOREIGN PATENT DOCUMENTS

| JP | 2000281737 A | 10/2000 |
| KR | 20120084572 A | 7/2012 |
| KR | 20170019150 A | 2/2017 |

OTHER PUBLICATIONS

David D.Wisnoski et al., "Microwave-initiated living free radical polymerization: rapid formation of custom Rasta resins," Tetrahedron Letters, Jun. 2, 2003, pp. 4321-4325, vol. 44, Issue 23.

(Continued)

*Primary Examiner* — Karie O'Neill Apicella
(74) *Attorney, Agent, or Firm* — Cantor Colburn LLP

(57) ABSTRACT

A polymer electrolyte including a copolymer represented by Formula 1; and a lithium salt:

Formula 1 wherein, in Formula 1, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $L_1$, n1, x, y, and z are as disclosed herein.

24 Claims, 3 Drawing Sheets

(51) Int. Cl.

| | | |
|---|---|---|
| *C08L 51/06* | (2006.01) | |
| *C08G 61/04* | (2006.01) | |
| *C08G 81/02* | (2006.01) | |
| *C08L 33/00* | (2006.01) | |
| *H01M 10/052* | (2010.01) | |
| *C08K 3/105* | (2018.01) | |
| *C08G 65/332* | (2006.01) | |
| *C08F 220/28* | (2006.01) | |

(52) U.S. Cl.
CPC ....... *C08G 65/3322* (2013.01); *C08G 81/025* (2013.01); *C08K 3/105* (2018.01); *C08L 33/00* (2013.01); *C08L 51/06* (2013.01); *H01M 10/052* (2013.01); *H01M 10/0525* (2013.01); *C08G 2261/1426* (2013.01); *C08L 2203/20* (2013.01); *C08L 2205/025* (2013.01); *H01M 2300/0082* (2013.01)

(56) References Cited

U.S. PATENT DOCUMENTS

2016/0365606 A1   12/2016  Sivanandan et al.
2017/0301949 A1*  10/2017  Mimura .............. H01M 10/052

OTHER PUBLICATIONS

Extended European search report issued by the European Patent Office dated Feb. 11, 2019 in the examination of the European Patent Application No. 18206966.6, which corresponds to U.S. Appl. No. 16/158,351.

Guopeng Fu et al., "Effect of Side-Chain Branching on Enhancement of Ionic Conductivity and Capacity Retention of a Solid Copolymer Electrolyte Membrane," Langmuir, Nov. 17, 2017, pp. 13973-13981, vol. 33, Issue 49.

WenqiangYao et al., "Fluorinated poly(meth)acrylate: Synthesis and properties," Polymer, Nov. 18, 2014, pp. 6197-6211, vol. 55, Issue 24.

* cited by examiner

POLYMER ELECTROLYTE, POLYMER, ELECTROCHEMICAL DEVICE, AND METHOD OF PREPARING THE POLYMER

CROSS-REFERENCE TO RELATED APPLICATION

This application claims priority to and the benefit of Korean Patent Application No. 10-2018-0002293, filed on Jan. 8, 2018, in the Korean Intellectual Property Office, and all the benefits accruing therefrom under 35 U.S.C. § 119, the disclosure of which is incorporated herein in its entirety by reference.

BACKGROUND

1. Field

The present disclosure relates to a polymer electrolyte, a copolymer, an electrochemical device, and a method of preparing the copolymer.

2. Description of the Related Art

Lithium secondary batteries are excellent in charge/discharge efficiency and capacity, have no memory effect, and have low natural discharge even when not in use. Thus, after commercialization, such a lithium secondary battery is useful as a key component of a portable electronic device. In recent years, use of a lithium secondary battery has been expanded from a field where small and medium batteries are used, for example, in a vacuum cleaner or an electrically-powered tool, to a field where medium and large batteries are used, for example, in an electric vehicle, an energy storage device, and various types of robots.

Polymer electrolytes used in a lithium secondary battery commonly include polyethylene oxide (PEO). However, PEO has a low ionic conductivity due to high crystallinity at room temperature, and thus a temperature of about 60° C. or greater is often necessary for their use during the operation of the lithium secondary battery. Since PEO is oxidized at a high voltage of about 3.8 V (vs. Li), the PEO also presents challenges when used for lithium battery applications that include the use of a high-voltage positive electrode.

Therefore, the need remains for a polymer electrolyte having lower crystallinity at room temperature and better stability at a higher voltages.

SUMMARY

Provided is a polymer electrolyte that is electrochemically stable.

Provided is a copolymer.

Provided is an electrochemical device including a polymer electrolyte or a copolymer.

Provided is a method of preparing a stretched copolymer.

Additional aspects will be set forth in part in the description which follows and, in part, will be apparent from the description, or may be learned by practice of the presented embodiments.

According to an embodiment, there is provided a polymer electrolyte including: a copolymer represented by Formula 1; and a lithium salt:

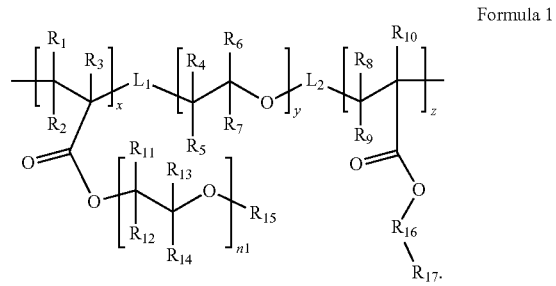

Formula 1

In Formula 1, each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{17}$ may be the same or different, and may each independently be a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, each $R_{16}$ may be the same or different, and may be a covalent bond; a linear or branched $C_1$-$C_{10}$ alkyl group that is unsubstituted or substituted with halogen; -($-R_a$—O—$)_k$—, wherein k may be an integer of 2 to 100, and $R_a$ may be a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group including one or more of the foregoing groups, $L_1$ may be a covalent bond or —$R_b$—C(=O)—O—, and $L_2$ may be a covalent bond; or —C(=O)—$R_c$—, wherein $R_b$ and $R_c$ may each independently be a linear or branched $C_1$-$C_{20}$ alkylene group, n1 may be an integer of 2 to 100, and x, y, and z are each mole fractions in repeating units, wherein 0<x<1, 0<y<1, 0<z<1, and x+y+z=1.

According to another embodiment, there is provided a copolymer represented by Formula 1:

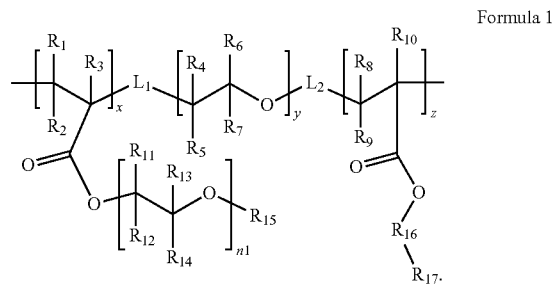

Formula 1

In Formula 1, each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{17}$ may be the same or different, and may each independently be a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{19}$ aryl group that is unsubstituted or substituted with halogen; or a $C_2$-$C_{10}$ heteroaryl group that is unsubstituted or substituted with halogen, each $R_{16}$ may be the same or different, and may be a covalent bond; a linear or branched $C_1$-$C_{10}$ alkyl group that is unsubstituted or substituted with halogen; -(—$R_a$—O—)$_k$—, wherein k may be an integer of 2 to 100, and $R_a$ may be a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group including one or more of the foregoing groups, $L_1$ may be a covalent bond or —$R_b$—C(=O)—O—, and $L_2$ may be a covalent bond; or —C(=O)—$R_c$—, wherein $R_b$ and $R_c$ may each independently be a linear or branched $C_1$-$C_{20}$ alkylene group, n1 may be an integer of 2 to 100, x, y, and z are each mole fractions of repeating units, wherein 0<x<1, 0<y<1, 0<z<1, and x+y+z=1, and the copolymer may have a number average molecular weight of about 2,000 Dalton to about 500,000 Dalton.

According to another embodiment, there is provided an electrochemical device including: a first electrode; a second electrode; and an electrolyte disposed between the first electrode and the second electrode, wherein at least one of the first electrode, the second electrode, and the may include the copolymer.

According to another embodiment, there is provided a method of preparing a copolymer, the method including: mixing a first monomer including an alkylene oxide repeating unit, a second monomer including an ester group, and initiator including an alkylene oxide repeating unit to obtain a mixture; and reacting the first monomer, the second monomer, and the initiator to obtain the copolymer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
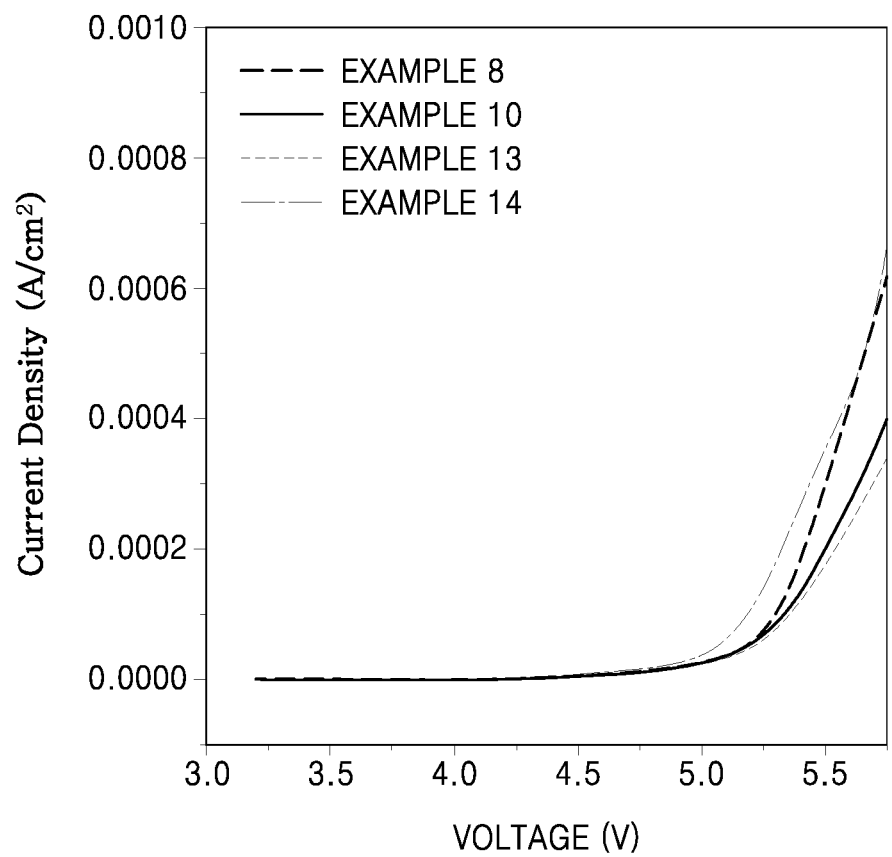
FIG. 1 is a graph of current density (I, amperes per square centimeter (A/cm$^2$) showing the results of linear sweeping voltammetry measurements of polymer electrolytes prepared according to Examples 8, 10, 13, and 14.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects and it is to be appreciated that changes, equivalents, and/or substitutes that do not depart from the spirit and technical scope of the present disclosure are encompassed herein.

As used herein, the term "and/or" includes any and all combinations of one or more of the associated listed item. "or" means "and/or." The singular forms "a," "an," and "the" are intended to include the plural forms. Expressions such as "at least one of," when preceding a list of elements, modify the entire list of elements and do not modify the individual elements of the list.

The terms used in the present specification are used to describe particular embodiments, and are not intended to be limiting. An expression used in the singular forms "a," "an," and "the" encompasses the expression of the plural, including "at least one," unless it has a clearly different meaning in the context provided. In the present specification, it is to be understood that the terms such as "includes" and/or "including," "haves" and/or "having," and "comprises" and/or "comprising" are intended to indicate the existence of the stated features, numbers, steps, actions, components, parts, and/or combinations thereof disclosed in the specification, and are not intended to preclude the possibility that one or more other features, numbers, steps, actions, components, parts, and/or combinations thereof may exist or may be added. As used herein, "/" may be interpreted as "and" or "or" depending on the situation.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

In order to clearly illustrate various components, layers, and regions in the drawings, diameters, lengths, and thicknesses may be exaggerated or reduced. Throughout the specification, like reference numerals may denote like elements in the drawings. It will be understood that, throughout the specification, when a layer, a film, or a plate is referred to as being "on" or "above" another layer, film, or plate, it can be directly or indirectly formed on the other layer, film, or plate. That is, for example, intervening layers, films, or plates may be present therebetween. In contrast, when an element is referred to as being "directly on" another element, there are no intervening elements present. While such terms as "first," "second," etc., may be used herein to describe various elements, components, regions, layers, and/or sections, such elements, components, regions, layers, and/or sections should not be limited by these terms throughout the specification. These terms are used only to distinguish one element, component, region, layer, or section from another element, component, region, layer, or section. Thus, "a first element," "component," "region," "layer," or "section" discussed below could be termed a second element, component, region, layer, or section without departing from the teachings herein. In the drawings, some of the elements may be omitted, but such omissions are not intended to exclude the omitted elements, but are intended to help understanding of the features of the present inventive concept.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Hereinafter, according to one or more exemplary embodiments, a polymer electrolyte, a copolymer, an electrochemical device including the copolymer, and a method of preparing the copolymer will be described in detail.

According to an aspect of an embodiment, a polymer electrolyte may include a copolymer represented by Formula 1 and a lithium salt:

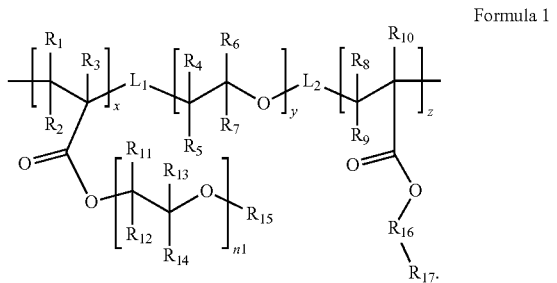

Formula 1

In Formula 1, each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{17}$ may be the same or different, and may each independently be a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, each $R_{16}$ may be the same or different, and may be a covalent bond; a linear or branched $C_1$-$C_{10}$ alkylene group that is unsubstituted or substituted with halogen; -($R_a$—O—)$_k$—, wherein k may be an integer of 2 to 100, and $R_a$ may be a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group comprising one or more of the foregoing groups, Li may be a covalent bond or —$R_b$—C(=O)—O—, and $L_2$ may be a covalent bond or —C(=O)—$R_c$—, wherein $R_b$ and $R_c$ may each independently be a linear or branched $C_1$-$C_{20}$ alkylene group, n1 may be an integer of 2 to 100, and x, y, and z are each mole fractions in repeating units, wherein 0<x<1, 0<y<1, 0<z<1, and x+y+z=1.

The copolymer represented by Formula 1 may have alkylene oxide repeating units arranged in a main chain and a side chain of the copolymer at the same time, wherein the main chain of the copolymer is defined as the chain including linking groups $L_1$ and $L_2$ in Formula 1. Without being bound by theory, due to the alkylene oxide repeating units arranged in the side chain of the polymer, the crystallization of the copolymer may be suppressed, resulting in less crystallinity as compared with the conventional polyethylene oxide (PEO). Therefore, in a polymer electrolyte including the copolymer represented by Formula 1, the transfer of lithium ions may be easier than the transfer in a polymer electrolyte including the conventional polyethylene oxide. In addition, the copolymer represented by Formula 1 may include a functional group, such as an ester group and/or a halogen atom, having oxidation resistance, thereby improving oxidation resistance as compared with the conventional polyethylene oxide. Consequently, the crystallization of the polymer electrolyte including the copolymer represented by Formula 1 may be reduced, whereas ionic conductivity and high-voltage stability of the same polymer electrolyte may be improved.

The term "oxidation resistance" as used herein refers to a high degree of voltage at which oxidation current increases with respect to lithium metal. In this regard, a polymer with high oxidation resistance may be electrochemically stable over a wide voltage range, due to the increased voltage at which the oxidation current increases.

In an embodiment, the main chain of the copolymer represented by Formula 1 may include at least one first block including a plurality of first repeating units that are connected to each other, the first repeating units being represented by Formula 1a:

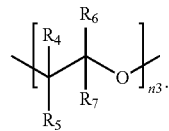

Formula 1a

In Formula 1a, $R_4$, $R_5$, $R_6$, and $R_7$ may each independently be a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, and n3 may be an integer of 2 to 250, and for example, may be an integer of 2 to 200.

The inclusion of the first block in the main chain of the copolymer may provide physical properties that distinguish an olefin-based copolymer including a main chain consisting of hydrocarbons. The first block may be, for example, a polyalkylene oxide block. The first block may have lithium ionic conductivity, and may act as, for example, a conduction channel of lithium ions. The first block may have a number average molecular weight (Mn) of, for example, about 100 to about 10,000 Dalton, about 200 to about 8,000 Dalton, about 400 to about 6,000 Dalton, about 800 to about 5,000 Dalton, about 1,000 to about 4,000 Dalton, or about 1,000 to about 3,000 Dalton.

In an embodiment, the main chain of the copolymer may include at least one second block including a second repeating unit represented by Formula 1 b and a third repeating unit represented by Formula 1c, wherein the second block is a random copolymer:

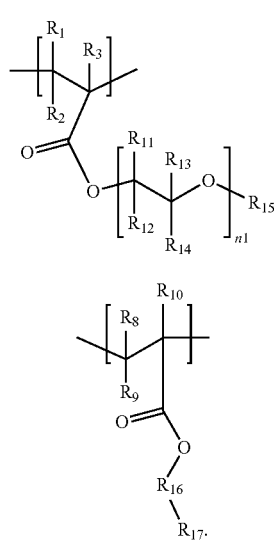

Formula 1b

Formula 1c

In Formulae 1b and 1c, $R_1$, $R_2$, $R_3$, $R_8$, $R_9$, $R_{10}$, $R_{11}$, $R_{12}$, $R_{13}$, $R_{14}$, $R_{15}$, and $R_{17}$ may each independently be a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, and $R_{16}$ may be a covalent bond; a linear or branched $C_1$-$C_{10}$ alkylene group that is unsubstituted or substituted with halogen; -($-R_a$—O—$)_k$—, wherein k may be an integer of 2 to 100, and $R_a$ may be a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group including one or more of the foregoing groups.

As the main chain of the copolymer includes the second repeating unit and the third repeating unit that are randomly arranged therein, an increase in the crystallinity of the copolymer due to the presence of the first block including the first repeating units may be suppressed. In addition, as the second repeating unit and the third repeating unit each include an ester group and optionally a fluorine atom, the copolymer may have an improved oxidation resistance. The copolymer may include a second block in which the second repeating and the third repeating unit are randomly arranged. The second block may have partial lithium ion conductivity by including a polyalkylene repeating unit in a portion of a side chain of the second block, and the second block may act as, for example, a partial conduction channel of lithium ions. The second block may be, for example, a comb-like polymeric block. In the copolymer including the first block and the second block, for example, the second block may reduce, for example suppress, an increase of the crystallinity of the copolymer, for example as caused by the first block.

For example, the copolymer represented by Formula 1 included in the polymer electrolyte may be represented by Formula 2:

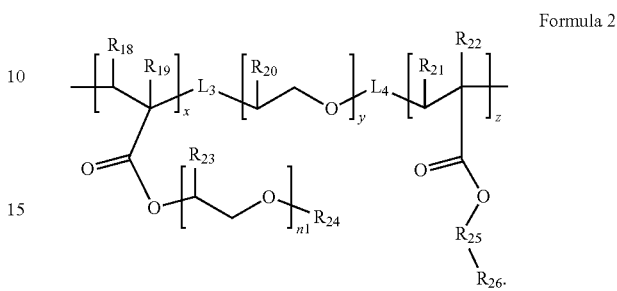

Formula 2

In Formula 2, each $R_{18}$, $R_{19}$, $R_{20}$, $R_{21}$, $R_{22}$, $R_{23}$, $R_{24}$, and $R_{26}$ may be the same or different, may each independently be a hydrogen atom; a halogen atom; a linear or branched $C_1$-$C_{10}$ alkyl group that is unsubstituted or substituted with halogen; or a $C_6$-$C_{10}$ cycloalkyl group that is unsubstituted or substituted with halogen; $R_{26}$ may be a covalent bond; a linear or branched $C_1$-$C_{10}$ alkylene group that is unsubstituted or substituted with halogen; -($-R_a$—O—$)_k$—, wherein k may be an integer of 2 to 100, and $R_a$ may be a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group including one or more of the foregoing groups, $L_3$ may be a covalent bond or —C(CH$_3$)$_2$—CH$_2$CH$_2$—O(=O)—O—, $L_4$ may be a covalent bond or —O(=O)—CH$_2$CH$_2$—C(CH$_3$)$_2$—, n1 may be an integer of 2 to 100, and x, y, and z are each mole fractions in repeating units, wherein 0<x<1, 0<y<1, 0<z<1, and x+y+z=1.

For example, the copolymer represented by Formula 1 included in the polymer electrolyte may be represented by Formula 3:

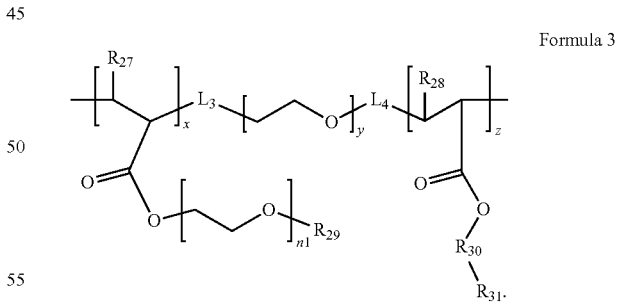

Formula 3

In Formula 3, each $R_{27}$, $R_{28}$, $R_{29}$, and $R_{31}$ may be the same or different, and may each independently be a hydrogen atom; a halogen atom; —$C_nH_{2n+1}$ (1≤n≤10), —$C_nF_{2n+1}$ (1≤n≤10), —$C_nF_{2n}H$ (1≤n≤10), or —$C_nH_n(CF_3)_{n+1}$ (1≤n≤4), $R_{30}$ may be a covalent bond; a linear or branched $C_1$-$C_{10}$ alkylene group that is unsubstituted or substituted with halogen; or -($-R_a$—O—$)_k$—, wherein k may be an integer of 2 to 100, and $R_a$ may be a C2-C10 alkylene group that is unsubstituted or substituted with halogen, $L_3$ may be a covalent bond or —C(CH$_3$)$_2$—CH$_2$CH$_2$—C(=O)—O—, $L_4$ may be a covalent bond or —C(=O)—CH$_2$CH$_2$—C(CH$_3$)$_2$—, n1 may be an integer of 2 to 100, and x, y, and z are each mole fractions in repeating units, wherein 0<x<1, 0<y<1, 0<z<1, and x+y+z=1.

For example, the polymer represented by Formula 1 included in the polymer electrolyte may be represented by one of Formulae 4 to 8:

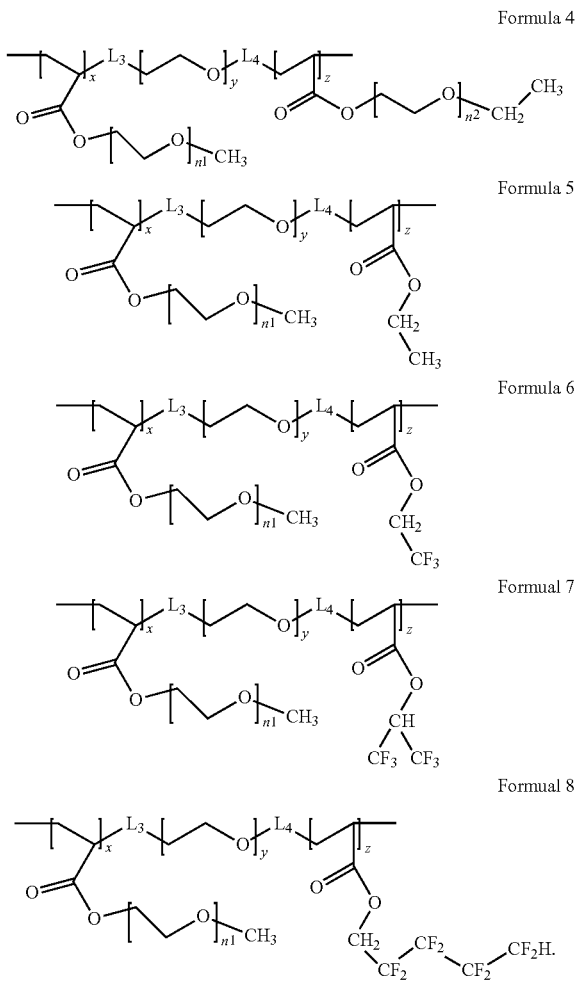

Formula 4

Formula 5

Formula 6

Formual 7

Formual 8

In Formulae 4 to 8, $L_3$ may be a covalent bond or —C(CH$_3$)$_2$—CH$_2$CH$_2$—C(=O)—O—, $L_4$ may be a covalent bond or —C(=O)—CH$_2$CH$_2$—C(CH$_3$)$_2$—, n1 and n2 may each independently be an integer of 2 to 100, and x, y, and z are each mole fractions in repeating units, wherein 0<x<1, 0<y<1, 0<z<1, and x+y+z=1.

In the copolymer represented by one of Formulae 1 to 8 in the polymer electrolyte, for example, x, y, and z may satisfy 0<x<0.5, 0.001<y<0.5, and 0<z<0.75, respectively. When the copolymer includes the first repeating unit, the second repeating unit, and the third repeating unit at such a molar ratio above, the polymer electrolyte including the copolymer may have further improved physical properties.

In an embodiment, the copolymer represented by one of Formulae 1 to 8 in the polymer electrolyte may have enthalpy of fusion (ΔHm at 196.8 J/g) that is about 30% or less, about 25% or less, about 20% or less, about 15% or less, about 10% or less, or about 5% or less of an enthalpy of fusion of polyethylene oxide (PEO) having 100% crystallinity, wherein the enthalpy of fusion ΔHm is obtained by a differential scanning calorimeter (DSC). In other words, if the enthalpy of fusion for an exemplary PEO having 100% crystallinity is 100, the enthalpy of fusion for the corresponding exemplary copolymer can be about 30 or less. The enthalpy of fusion ΔHm may be calculated from an area of a phase transition peak appearing in a DSC thermogram. Due to the alkylene oxide repeating unit arranged in the side chain of the copolymer represented by one of Formulae 1 to 8, the crystallization of the copolymer may be reduced, for example suppressed, and crystallization (i.e., the degree of crystallinity) of the copolymer may be also reduced as compared with the degree of crystallinity of a PEO homopolymer, resulting in a decrease in the enthalpy of fusion ΔHm of the copolymer at the time of phase transition. Therefore, according to the DSC measurements, the enthalpy of fusion ΔHm of the copolymer represented by one of Formulae 1 to 8 may be significantly less than the enthalpy of fusion of the PEO homopolymer having crystallinity of less than 100%. For example, according to the DSC measurements, the enthalpy of fusion ΔHm of the copolymer represented by one of Formulae 1 to 8 may be significantly less than that of polyethylene glycol (PEG 6000) which has a crystallinity of about 90% and is solid at room temperature (ca. 25° C.). For example, according to the DSC measurements, the crystallinity of the copolymer represented by Formula 1 may be about 30% or less, about 25% or less, about 20% or less, about 15% or less, about 10% or less, or about 5% or less of that of PEO having 100% crystallinity.

The copolymer represented by one of Formula 1 to 8 may have a melting temperature (Tm) at about 60° C. or less, about 55° C. or less, about 50° C. or less, about 45° C. or less, about 40° C. or less, or about 35° C. or less. For example, the copolymer may have a Tm of about 20° C. to about 60° C., about 20° C. to about 50° C., about 20° C. to about 40° C., or about 20° C. to about 30° C. Without being bound by theory, due to low melting temperature Tm of the copolymer represented by one of Formulae 1 to 8, the polymer electrolyte including the copolymer represented one of Formulae 1 to 8 may remain in a molten state or an amorphous state at a temperature of 60° C. or less, and may improve ionic conductivity, resulting in improving the charge/discharge characteristics of a lithium battery including the polymer electrolyte.

The copolymer represented by one selected from Formulae 1 to 8 may have a number average molecular weight (Mn) of, for example, about 2,000 to about 500,000 Dalton, about 2,000 to about 400,000 Dalton, about 2,000 to about 300,000 Dalton, about 2,000 to about 200,000 Dalton, about 2,000 to about 100,000 Dalton, about 2,000 to about 50,000 Dalton, about 2,000 to about 30,000 Dalton, about 2,000 to about 20,000 Dalton, about 2,000 to about 15,000 Dalton, or about 2,000 to about 10,000 Dalton. In addition, the copolymer may have a polydispersity index (PDI) of, for example, about 1 to about 3, about 1.5 to about 2.5, or about 1.8 to about 2.2.

The polymer electrolyte may include a lithium salt, and due to the lithium salt included therein, the polymer electrolyte may act as a more effective electrolyte.

The lithium salt included in the polymer electrolyte may have a concentration of, for example, about 0.01 M to about 5.0 M, about 0.05 M to about 4.0 M, about 0.1 M to about 3.0 M, about 0.5 M to about 2.0 M, or about 0.5 M to about 1.5 M, based on the total volume of the polymer electrolyte. When the polymer electrolyte includes the lithium salt within the ranges above, the polymer electrolyte may further improve ionic conductivity thereof. The lithium salt may include at least one of LiPF$_6$, LiBF$_4$, LiCF$_3$SO$_3$, Li(CF$_3$SO$_2$)$_2$N, LiC$_2$F$_5$SO$_3$, Li(FSO$_2$)$_2$N, LiC$_4$F$_9$SO$_3$, LiN(SO$_2$CF$_2$CF$_3$)$_2$, or a compound represented by one of Formulae 9 to 12, but embodiments of the present disclosure are not limited thereto. Any suitable lithium salt may be used in the polymer electrolyte, including those in the art.

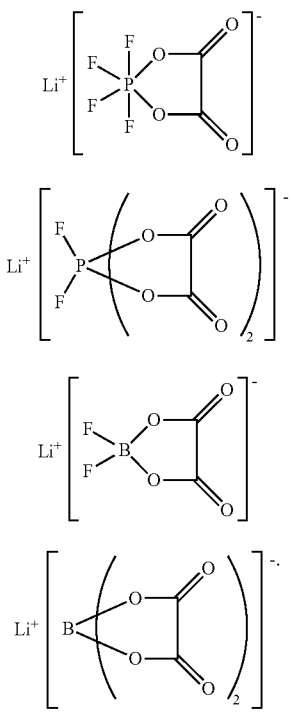

Formula 9

Formula 10

Formula 11

Formula 12

The polymer electrolyte including the copolymer represented by one of Formulae 1 to 8 and the lithium salt may be liquid at a temperature of about 40° C. or less, about 35° C. or less, about 30° C. or less, about 25° C. or less, or about 20° C. or less. For example, the polymer electrolyte including the copolymer and the lithium salt may be a liquid at a temperature of about 15° C. to about 40° C., about 20° C. to about 40° C., or about 25° C. to about 40° C. Due to the lithium salt included with the copolymer represented by one of Formulae 1 to 8, the melting temperature Tm of the polymer electrolyte may be lower than that of the copolymer itself. Since the polymer electrolyte including the copolymer represented by one of Formulae 1 to 8 and the lithium salt is a liquid at a temperature of about 40° C. or less, the polymer electrolyte may be applied to various types of electrochemical devices without an additional heating process. In addition, in the liquid polymer electrolyte, the transfer of lithium ions may be enhanced, so that the polymer electrolyte may have improved ionic conductivity.

The polymer electrolyte including the copolymer represented by one of Formulae 1 to 8 and the lithium salt may have the ionic conductivity of, for example, about $7.0 \times 10^{-5}$ (Siemens per centimeter) S/cm or more, about $7.5 \times 10^{-5}$ S/cm or more, about $8 \times 10^{-5}$ S/cm or more, about $9 \times 10^{-5}$ S/cm or more, about $1 \times 10^{-4}$ S/cm or more, about $2 \times 10^{-4}$ S/cm or more, or about $3 \times 10^{-4}$ S/cm or more, at a temperature of about 60° C. Due to the low crystallinity of the copolymer represented by one of Formulae 1 to 8, the polymer electrolyte including the copolymer may have improved ionic conductivity. Due to the improved ionic conductivity of the polymer electrolyte, a lithium battery including the polymer electrolyte may have improved cycle characteristics.

Referring to FIG. 1, the polymer electrolyte including the copolymer represented by one of Formulae 1 to 8 and the lithium salt is electrochemically stable as shown in a voltage window of about 4.0 Volts (V) to about 4.5 V (vs. Li). Since the polymer electrolyte includes the copolymer represented by one of Formulae 1 to 8 with improved oxidation resistance, the polymer electrolyte may be electrochemically stable at a high voltage of at least 4.0 V (vs. Li). In this regard, the polymer electrolyte may be suitable for use as an electrolyte of a lithium battery including a high-voltage (4.0 V or more) positive electrode, whereas a polymer electrolyte including PEO may be oxidized and degraded at a voltage of about 3.8 V (vs. Li), so that such a polymer may not be easily applied to a high-voltage positive electrode.

In an embodiment, the polymer electrolyte may further include organic liquid. Due to the organic liquid additionally included in the polymer electrolyte, the polymer electrolyte may have further improved ionic conductivity. The organic liquid may include, for example, at least one of an organic solvent and ionic liquid.

The organic solvent may be an ether-based solvent or a carbonate-based solvent, but embodiments of the present disclosure are not limited thereto. Any suitable material available as a solvent in an electrolyte, including those in the art, and stable with respect to lithium metal may be used. The organic solvent may include, for example, at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyl tetrahydrofuran, γ-butyrolactone, dioxolane, 4-methyldioxolane, dimethylacetamide, dimethylsulfoxide, dioxane, 1,2-dimethoxyethane, diethylene glycol dimethyl ether, sulfolane, dichloroethane, chlorobenzene, nitrobenzene, diethylene glycol, succinonitrile, and dimethylether, but embodiments of the present disclosure are not limited thereto. Any suitable solvent available as a solvent for an electrolyte in the art and electrochemically stable within an operation range of an electrochemical device may be used.

The ionic liquid may be represented by, for example, Formula 13 or 14:

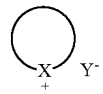

Formula 13

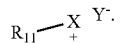

Formula 14

In Formula 13, the structure

indicates a 3-membered to 30-membered ring including 2 to 29 carbon atoms and at least one heteroatom, and such a ring may be a heterocycloalkyl ring or a heteroaryl ring, wherein X may be $-N(R_2)(R_3)-$, $-N(R_2)=$, $-P(R_2)=$, or $-P(R_2)(R_3)-$, and $Y^-$ may be an anion.

In Formula 14, X may be $-N(R_2)(R_3)(R_4)$ or $-P(R_2)(R_3)(R_4)$, $R_{11}$ may be a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkyleneoxide group, and $Y^-$ may be an anion.

In Formulae 13 and 14, $R_2$ and $R_3$ are each independently a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkyleneoxide group; and $Y^-$ may be at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $C_2N_3^-$, $SCN^-$, $CF_3SO_3^-$, $(C_2F_6SO_2)_2N^-$, $(C_2F_5SO_2)(CF_3SO_2)N^-$, or $(CF_3SO_2)_2N^-$, $NO_3^-$, for example, at least one of $BF_4^-$, $Cl^-$, $Br^-$, $I^-$, $PF_6^-$, $ClO_4^-$, $CF_3SO_3^-$, $(CF_3SO_2)_2N^-$, $CF_3CO_2^-$, or $(C_2F_5SO_2)_2N^-$.

For example,

in Formula 13 may be represented by Formula 14:

Formula 14

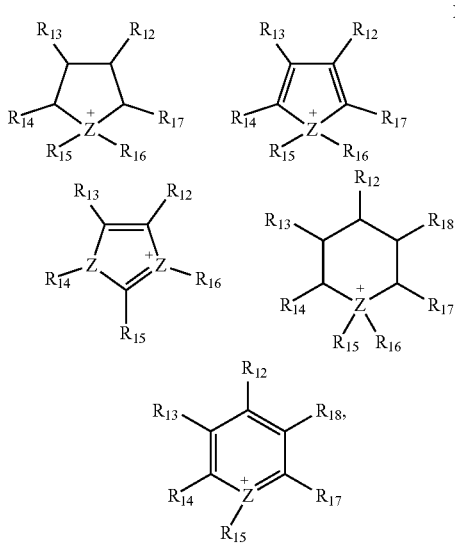

wherein, in Formula 14, Z may be nitrogen (N) or phosphorus (P), $R_{12}$ to $R_{15}$ may each independently be hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkyleneoxide group.

In an embodiment,

in Formula 13 may be a cation represented by Formula 15:

Formula 12

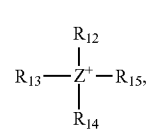

wherein, in Formula 15, Z may be N or P, $R_{12}$ to $R_{15}$ may each independently be hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ aryloxy group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ cycloalkyl group, a substituted or unsubstituted $C_3$-$C_{30}$ heterocycloalkyl group, or a substituted or unsubstituted $C_2$-$C_{100}$ alkyleneoxide group.

The ionic liquid may include, for example, at least one cation that may be an ammonium cation, an imidazolium cation, a piperidinium cation, and a pyridinium cation, and at least one anion that may be a bis(trifluoromethylsulfonyl) imide (TFSI) anion, a bromide anion, a chloride anion, a perchlorate anion, a dicyanamide anion, a hexafluorophosphate anion, an iodide anion, a sulfonate anion, an amide anion, a sulfonimide anion, a nitrate anion, a tetrafluoroborate anion, a thiocyanate anion, a triflate anion. The ionic liquid may be, for example, [emim]Cl/AlCl$_3$ (wherein emim is ethyl methyl imidazolium), [bmpyr]NTf2 (wherein bppyr is butyl methyl pyridinium), [bpy]Br/AlCl$_3$ (wherein bpy is 4, 4'-bipyridine), [choline]Cl/CrCl$_3$.6H$_2$O, [Hpy(CH$_2$)$_3$pyH][NTf$_2$]$_2$ (wherein Hpy=pyH=1-hexylpyridinium, NTf is trifluoromethanesulfonimide), [emim]OTf/[hmim]I (wherein hmim is hexyl methyl imidazolium), [choline]Cl/HOCH$_2$CH$_2$OH, [Et$_2$MeN(CH$_2$CH$_2$OMe)]BF$_4$ (wherein Et is ethyl, Me is methyl, Pr is propyl, Bu is butyl, Ph is phenyl, Oct is octyl, and Hex is hexyl), [Bu$_3$PCH$_2$CH$_2$C$_8$F$_{17}$]OTf (wherein OTf is trifluoromethane sulfonate), [bmim]PF$_6$ (wherein bmim is butyl methyl imidazolium), [bmim]BF$_4$, [omim]PF$_6$ (wherein omim is octyl methyl imidazolium), [Oct$_3$PC$_{18}$H$_{37}$]I, [NC(CH$_2$)$_3$mim]NTf2 (wherein mim is methyl imidazolium), [Pr$_4$N][B(CN)$_4$], [bmim]NTf$_2$, [bmim]Cl, [bmim][Me(OCH$_2$CH$_2$)$_2$OSO$_3$], [PhCH$_2$mim]OTf, [Me$_3$NCH(Me)CH(OH)Ph] NTf$_2$, [pmim][(HO)$_2$PO$_2$] (wherein pmim is propyl methyl imidazolium), [b(6-Me)quin]NTf$_2$ (where bquin is butyl quinolinium), [bmim][Cu$_2$Cl$_3$], [C$_{18}$H$_{37}$OCH$_2$mim]BF$_4$ (wherein mim is methyl imidazolium), [heim]PF$_6$ (wherein heim is hexyl ethyl imidazolium), [mim(CH$_2$CH$_2$O)$_2$CH$_2$CH$_2$mim][NTf$_2$]$_2$ (wherein mim is methyl imidazolium), [obim]PF$_6$ (wherein obim is octyl butyl imidazolium), [oquin]NTf$_2$ (wherein oquin is octyl quinolinium), [hmim][PF$_3$(C$_2$F$_5$)$_3$], [C$_{14}$H$_{29}$mim]Br (wherein mim is methyl imidazolium), [Me$_2$N(C$_{12}$H$_{25}$)$_2$]NO$_3$, [emim]BF$_4$, [mm(3-NO$_2$)im][dinitrotriazolate] (wherein mm(3-NO$_2$)im=1,3-dimethyl(3-NO$_2$)imidazolium), [MeN(CH$_2$CH$_2$OH)$_3$], [MeOSO$_3$], [Hex$_3$PC$_{14}$H$_{29}$]NTf$_2$, [emim][EtOSO$_3$], [choline][ibuprofenate], [emim]NTf$_2$, [emim][(EtO)$_2$PO$_2$], [emim]Cl/CrCl$_2$, or [Hex$_3$PC$_{14}$H$_{29}$]N(CN)$_2$, but embodiments of the present disclosure are not limited thereto. Any suitable liquid available as ionic liquid, including those in the art, may be used. In addition, the ionic liquid may be, for example, Pyr13FSI (such as N-propyl, N-methyl pyrrolidinium bis(fluorosulfonyl)imide), Pyr14FSI (such as N-butyl, N-methyl pyrrolidinium bis(fluorosulfonyl)imide), Pyr13TFSI (such as N-propyl, N-methyl pyrrolidinium bis(trifluoromethanesulfonyl)imide), Pyr14TFSI (such as N-butyl, N-methyl pyrrolidinium bis(trifluoromethanesulfonyl)imide), Pyr13TBETI (such as N-propyl, N-methyl pyrrolidinium bis(pentafluoroethanesulfonyl)imide), Pyr14BETI (such as N-butyl, N-methyl pyrrolidinium bis(pentafluoroethanesulfonyl)imide), Pyr13IM14 (such as N-propyl, N-methyl pyrrolidinium (nonafluorobutyl-sulfonyl)imide), or Pyr14IM14 (such as N-butyl, N-methyl pyrrolidinium bis (nonafluorobutyl-sulfonyl)imide).

An amount of the organic liquid in the polymer electrolyte may be, for example, in a range of about 1 part to about 100 parts by weight, about 2 to about 90 parts by weight, about 3 parts to about 80 parts by weight, about 4 parts to about 70 parts by weight, about 5 parts to about 60 parts by weight, about 10 parts to about 50 parts by weight, or about 20 parts to about 40 parts by weight, based on 100 parts by weight of the copolymer. When the polymer electrolyte further includes the organic liquid within the ranges above, the polymer electrolyte may have the further improved ionic conductivity. In the case of a stretched polymer electrolyte, physical properties thereof, such as ionic conductivity or electrochemical stability may be possible controlled by controlling the organic liquid.

In an embodiment, the polymer electrolyte may further include an inorganic particle. Due to the inorganic particle further included in the polymer electrolyte, the polymer electrolyte may improve mechanical strength, and may further improve the ionic conductivity. The inorganic particle may be, for example, a filler. When the inorganic particle acts as a filler to form a framework of the polymer electrolyte, the polymer electrolyte may improve mechanical strength. The inorganic particle may include at least one selected from metal oxide, metal nitride, metal nitrate, metallic carbide, carbon oxide, carbon-based material, and an organic-inorganic composite, but embodiments of the present disclosure are not limited thereto. Any material available as a filler in an electrolyte in the art may be used. The inorganic particle may include, for example, at least one selected from SiO$_2$, TiO$_2$, Al$_2$O$_3$, AlN, SiC, BaTiO$_3$, graphite oxide, graphene oxide, metal organic framework (MOF), polyhedral oligomeric silsesquioxane (POSS), Li$_2$CO$_3$, Li$_3$PO$_4$, Li$_3$N, Li$_3$PS$_4$, Li$_2$O, and montmorillonite. The inorganic particle may be, for example, a particle without lithium ionic conductivity, and may be for example, a nanoparticles having a size of less than 1,000 nanometers (nm). The term "size" as used herein may refer to an average diameter with respect to a spherical particle, or may refer to an average length of a major axis with respect to a non-spherical particle. The particle size may be, for example, measured by using a particle size analyzer (PSA). The size of the inorganic particle may be, for example, about 1,000 nm or less, about 500 nm or less, about 200 nm or less, about 100 nm or less, about 90 nm or less, about 80 nm or less, about 70 nm or less, about 60 nm or less, about 50 nm or less, about 40 nm or less, about 30 nm or less, or about 20 nm or less. An amount of the inorganic particle may be, for example, of 15 weight percent (wt %) or less, about 10 wt % or less, 9 wt % or less, about 8 wt % or less, about 7 wt % or less, about 6 wt % or less, about 5 wt % or less, or about 4 wt % or less, based on the total weight of the polymer and the inorganic particle polymer electrolyte. When the polymer electrolyte further includes the inorganic particle within the amount above, the polymer electrolyte may further increase ionic conductivity. In the case of a stretched polymer electrolyte, physical properties thereof, such as ionic conductivity or electrochemical stability may be possible controlled by controlling the inorganic particle.

In an embodiment, the copolymer may be represented by Formula 1:

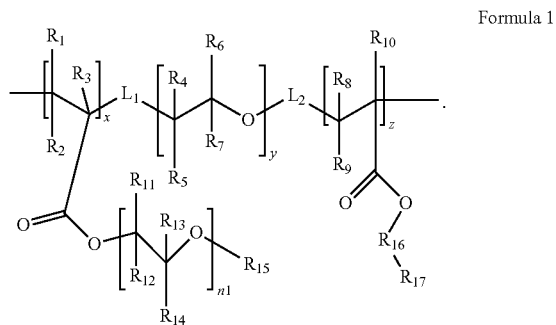

Formula 1

In Formula 1, each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{17}$ may be the same or different, and may each independently be a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, each $R_{16}$ may be the same or different, and may be a covalent bond; a linear or branched $C_1$-$C_{10}$ alkylene group that is unsubstituted or substituted with halogen; -(—$R_a$—O—)$_k$—, wherein k may be an integer of 2 to 100, and $R_a$ may be a $C_2$-$C_{10}$ alkylene group that is unsubstituted or substituted with halogen; a C6-C10 cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group including one or more of the foregoing groups, $L_i$ may be a covalent bond or —$R_b$—C(=O)—O—, and $L_2$ may be a covalent bond; or —C(=O)—$R_c$—, wherein $R_b$ and $R_c$ may each independently be a linear or branched $C_1$-$C_{20}$ alkylene group, n1 may be an integer of 2 to 100, and, and x, y, and z are each mole fractions in repeating units, wherein 0<x<1, 0<y<1, 0<z<1, and x+y+z=1.

The copolymer represented by Formula 1 may have polyalkylene oxide chains in both a main chain and a side chain of the copolymer, resulting in lower crystallinity as compared with the PEO homopolymer. Due to the polyalkylene oxide chains, the copolymer represented by Formula 1 may accordingly have a lower melting temperature Tm. In addition, the copolymer represented by Formula 1 may be electrochemically stable even at a high voltage of 4.0 V (vs. Li) by including a functional group, such as an ester group and/or a fluorine atom, having oxidation resistance, in the side chain. Therefore, the copolymer represented by Formula 1 may be applicable to an electrochemical device. The copolymer represented by Formula 1 may be a non-cross linked polymer.

In an embodiment, the main chain of the copolymer may include the first block in which a plurality of first repeating units are connected to each other, the first repeating unit being represented by Formula 1a, and may also include a second block including the second repeating unit represented by Formula 1b and the third repeating unit represented by Formula 1c, wherein the second block is a random copolymer:

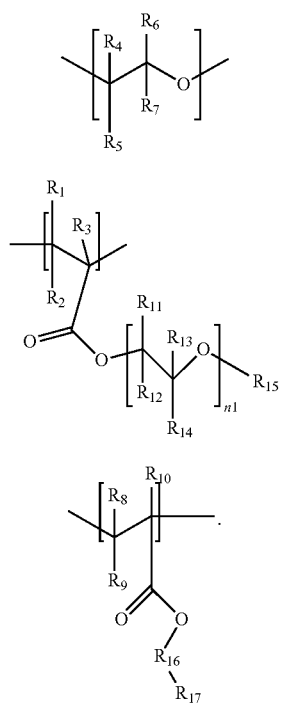

Formula 1a

Formula 1b

Formula 1c

In Formulae 1a to 1c, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{17}$ may each independently be a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, $R_{16}$ may be a covalent bond; a linear or branched $C_1$-$C_{10}$ alkylene group that is unsubstituted or substituted with halogen; -(—$R_a$—O—)$_k$—, wherein k may be an integer of 2 to 100, and $R_a$ may be a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group including one or more of the foregoing groups, and n3 may be an integer of 2 to 200.

Due to the first block, which includes the first repeating units, in the copolymer represented by Formula 1, the copolymer may have ionic conductivity. Due to the second repeating unit and the third repeating unit that are randomly arranged in the main chain of the copolymer represented by Formula 1, the copolymer have lower crystallinity, and accordingly, may have improved oxidation resistance.

The copolymer represented by Formula 1 may be, for example, represented by one of Formulae 4 to 8:

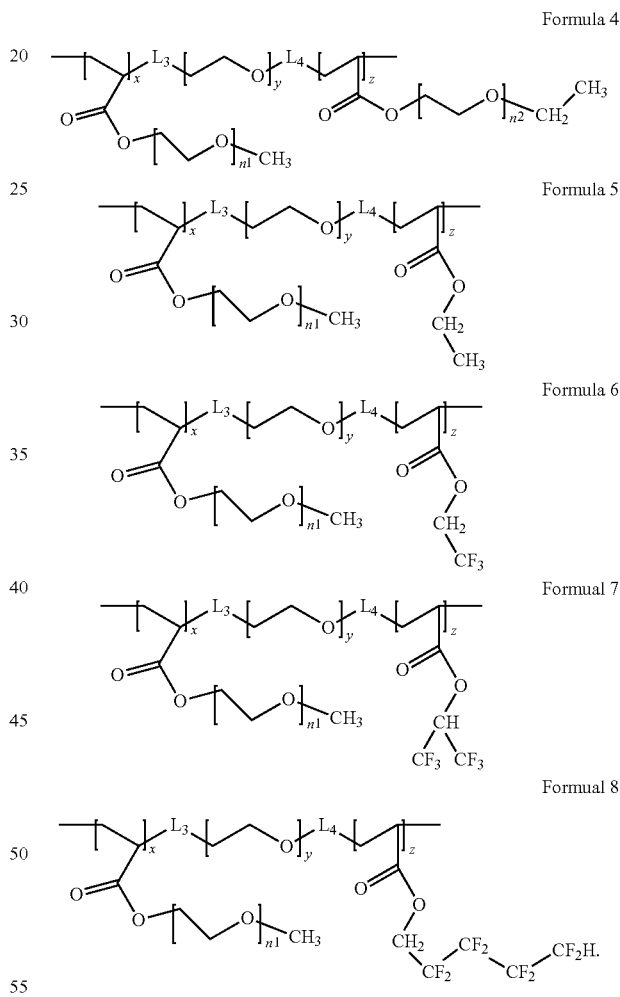

Formula 4

Formula 5

Formula 6

Formual 7

Formual 8

In Formulae 4 to 8, $L_3$ may be a covalent bond or —C(CH$_3$)$_2$—CH$_2$CH$_2$—C(=O)—O—, $L_4$ may be a covalent bond or —C(=O)—CH$_2$CH$_2$—C(CH$_3$)$_2$—, n1 and n2 may each independently be an integer of 2 to 100, x, y, and z each indicate a mole fraction, wherein 0<x<1, 0<y<1, 0<z<1, and x+y+z=1, and the copolymer may have a molecular weight of about 2,000 to about 500,000 Dalton.

The copolymer represented by one of Formulae 1 to 8 may have enthalpy of fusion ΔHm of about 10% or less than that of PEO having 100% crystallinity, and may have a melting temperature Tm of about 45° C. or less. Based on the physical properties above, the polymer represented by one selected from Formulae 1 to 8 may be suitable for application to the polymer electrolyte.

According to another embodiment of the present disclosure, an electrochemical device may include: a first electrode; a second electrode; and an electrolyte disposed between the first electrode and the second electrode, wherein at least one of the first electrode, the second electrode, and the electrolyte may include the copolymer described herein. In an embodiment, the electrolyte includes the polymer electrolyte described herein.

Due to the polymer electrolyte and/or the copolymer in the electrochemical device, the electrochemical device may provide improved electrochemical properties. For example, as the polymer electrolyte included in the electrochemical device may have the improved ionic conductivity, the electrochemical device may reduce internal resistance, thereby improving cycle characteristics. Examples of the electrochemical device may include a lithium battery, a capacitor, and an electrochromic device, but embodiments of the present disclosure are not limited thereto. Any device being disposed between a pair of electrodes and capable of being repeatedly charged and discharged or having color changes may be used. A lithium battery may include a lithium air battery, a lithium sulfur battery, or a lithium ion battery. In addition, a lithium battery may include a primary battery and a secondary battery.

Hereinafter, a method of preparing a lithium battery, which is one of the electrochemical devices, will be described. However, a method of preparing a lithium battery is not limited to such a method described herein, and a lithium battery may be prepared by various other methods.

A lithium battery may include a positive electrode; a negative electrode, and an electrolyte between the positive electrode and the negative electrode, wherein at least one of the positive electrode, the negative electrode, and the electrolyte may include the polymer described herein, for example the polymer electrolyte.

First, the positive electrode is prepared.

For example, a positive active material composition may be prepared by mixing a positive active material, a conducting agent, a binder, and a solvent. In one embodiment, the positive active material composition may be directly coated on a positive electrode current collector, and then dried to prepare a positive electrode plate on which a positive active material layer is formed. In one or more embodiments, the positive active material composition may be cast on a separate support to form a positive active material film, which may then be separated from the support and laminated on a positive electrode current collector to prepare a positive electrode plate on which a positive active material layer is formed. The positive electrode is not limited to the examples described above, and may have a variety of types.

The positive active material may include lithium transition metal oxide, and the lithium transition metal oxide may include at least one selected from lithium cobalt oxide, lithium nickel cobalt manganese oxide, lithium nickel cobalt aluminum oxide, lithium iron phosphorus oxide, and lithium manganese oxide, but embodiments of the present disclosure are not limited thereto. Any suitable material available as a positive active material in the art may be used.

The positive active material may be a compound represented by one of the following formulae:

$Li_aA_{1-b}B'_bD_2$ (where $0.90 \leq a \leq 1.8$ and $0 \leq b \leq 0.5$); $Li_aE_{1-b}B'_bO_{2-c}D_c$ (where $0.90 \leq a \leq 1.8$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be nickel (Ni), cobalt (Co), manganese (Mn), and combinations thereof; B' may be aluminum (Al), nickel (Ni), cobalt (Co), manganese (Mn), chromium (Cr), iron (Fe), magnesium (Mg), strontium (Sr), vanadium (V), a rare earth element, and combinations thereof; D may be oxygen (O), fluorine (F), sulfur (S), phosphorus (P), and combinations thereof; E may be cobalt (Co), manganese (Mn), and combinations thereof; F' may be fluorine (F), sulfur (S), phosphorus (P), and combinations thereof; G may be aluminum (Al), chromium (Cr), manganese (Mn), iron (Fe), magnesium (Mg), lanthanum (La), cerium (Ce), strontium (Sr), vanadium (V), and combinations thereof; Q may be titanium (Ti), molybdenum (Mo), manganese (Mn), and combinations thereof; I' may be chromium (Cr), vanadium (V), iron (Fe), scandium (Sc), yttrium (Y), and combinations thereof; and J may be vanadium (V), chromium (Cr), manganese (Mn), cobalt (Co), nickel (Ni), copper (Cu), and combinations thereof.

In addition, the positive active material may be, for example, a composite, which includes a coating layer that is additionally formed on a surface of a core including the above-described compound. The coating layer may include at least one compound of the coating element selected from oxide, hydroxide, oxyhydroxide, oxycarbonate, and hydroxycarbonate of the coating element. Such a compound of the coating element constituting the coating layer may be amorphous or crystalline. The coating element for the coating layer may be, for example, magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed using any method that does not adversely affect the physical properties of the positive active material when the compound of the coating element is used on the surface of the core including the above-described compound. The coating method may be, for example, a spray coating method or a dipping method. The coating method may be well understood by one of ordinary skill in the art, and thus a detailed description thereof will be omitted.

Examples of the positive active material may include $LiNiO_2$, $LiCoO_2$, $LiMn_xO_{2x}$ (where x=1, 2), $LiNi_{1-x}Mn_xO_2$ (where $0 < x < 1$), $LiNi_{1-x-y}Co_xMn_yO_2$ (where $0 \leq x \leq 0.5$ and $0 \leq y \leq 0.5$), and $LiFePO_4$.

The conducting agent is not particularly limited, so long as it has electrical conductivity without causing any chemical change in the lithium battery. Examples of the conducting agent may include natural or artificial graphite; carbon black, such as acetylene black, Ketjen black, channel black, furnace black, lamp black, thermal black, or the like; conductive fiber, such as carbon fiber, metal fiber, or the like;

fluorocarbon; metal powder, such as aluminum powder, nickel powder, or the like; conductive whiskey, such as zinc oxide, potassium titanate, or the like; conductive oxide, such as titanium oxide or the like; and conductive materials, such as polyphenylene derivatives, but embodiments of the present disclosure are not limited thereto. Any material available as a conducting agent in the art may be used. Here, an amount of the conducting agent may be, for example, in a range of about 1 wt % to about 20 wt % based on the total weight of the positive active material composition.

The binder may be a component that assists in the binding of the positive active material and additives, such as the conducting agent, and the binding of the current collector and the positive active material. Examples of the binder may include poly(vinylidene fluoride) (PVdF), poly(vinylidene chloride), poly(benzimidazole), polyimide, poly(vinyl acetate), poly(acrylonitrile), poly(vinyl alcohol), carboxymethyl cellulose (CMC), starch, hydroxypropyl cellulose, regenerated cellulose, poly(vinylpyrrolidone), polyethylene, polypropylene, polystyrene, poly(methylmethacrylate), polyaniline, acrylonitrile butadiene styrene, phenyl resin, epoxy resin, poly(ethylene terephthalate), poly(tetrafluoro ethylene), poly(phenylene sulfide), poly(amide imide), poly (ether imide), poly(ether sulfone), polyimide, polyacetal, poly(phenylene oxide), poly(butylene terephthalate), ethylene-propylene-diene terpolymer (EPDM), sulfonated EPDM, styrene butadiene rubber (SBR), fluoride rubber, and various copolymers, but embodiments of the present disclosure are not limited thereto. Any material available as a binder in the art may be used. Here, an amount of the binder may be, for example, in a range of about 1 wt % to about 30 wt % based on the total weight of the positive active material composition.

The solvent may be N-methyl-pyrrolidone, acetone, or water, but embodiments of the present disclosure are not limited thereto. Any suitable material available as a solvent, including those in the art, may be used. Here, an amount of the solvent may be, for example, in a range of about 10 parts to about 100 parts by weight based on 100 parts by weight of the positive active material. When the solvent is included within the range above, the active material layer may be further easily formed.

The amounts of the positive active material, the conducting agent, the binder, and the solvent may be in ranges that are commonly used in lithium batteries. At least one of the conducting agent, the binder, and the solvent may be omitted according to the use and the structure of the lithium battery.

In one embodiment, the positive electrode may use N-methylpyrrolidone (NMP) as the solvent, a PVdF or PVdF copolymer as the binder, and carbon black or acetylene black as the conducting agent. In one or more embodiments, to prepare the positive electrode, 94 wt % of the positive active material, 3 wt % of the binder, and 3 wt % of the conducting agent may be mixed in powder form, and then, NMP may be added to the mixture so that a solid content thereof is about 70 wt %. A slurry may be prepared therefrom, and the slurry may be coated, dried, and rolled to prepare the positive electrode.

A thickness of the positive electrode current collector may be, for example, about 3 micrometers (um) to about 50 um. The positive electrode current collector is not particularly limited, so long as it has high electrical conductivity without causing any chemical change in the lithium battery. The positive electrode current collector may be, for example, stainless steel, aluminum, nickel, titanium, calcined carbon, or the like, or aluminium or stainless steel that is surface-treated with carbon, nickel, titanium, silver, or the like. The positive electrode current collector may have a surface on which irregularities are formed, to thereby enhance the adhesive strength of the positive active material. The positive electrode current collector may be used in a suitable form including films, sheets foils, nets, porous structures, foams, non-woven fabrics, and the like.

In one embodiment, the positive electrode may further include the copolymer represented by one of Formulae 1 to 8 and/or the polymer electrolyte including the copolymer and the lithium salt. As the positive electrode further includes the copolymer and/or the polymer electrolyte, lithium ions may be more easily transferred into the positive electrode, thereby further reducing the internal resistance and/or the interface resistance of the positive electrode.

Next, the negative electrode is prepared.

For example, a negative active material composition is prepared by mixing a negative active material, a conducting agent, a binder, and a solvent. In one embodiment, the negative active material composition may be directly coated on a negative electrode current collector, and then dried to prepare a negative electrode plate on which a negative active material layer is formed. In one or more embodiments, the negative active material composition may be cast on a separate support to form a negative active material film, which may then be separated from the support and laminated on a negative electrode current collector to prepare a negative electrode to which a negative active material layer is formed. The negative electrode is not limited to the examples described above, and may have a variety of types.

The negative active material may include a metallic negative active material, a transition metal oxide, a non-transition metal oxide, and a carbonaceous material.

The metallic negative active material may include, for example, at least one selected from a lithium metal, a metal alloyable with lithium, a composite of carbon and a metal alloyable with lithium, a composite of nitrogen and a metal alloyable with lithium, a composite of carbon, nitrogen, and a metal alloyable with lithium, a composite of a metal that is inactive with lithium and a metal alloyable with lithium, a composite of a metal alloyable with lithium and a metal oxide that is inactive with lithium, a composite of a metal alloyable with lithium and a metal nitride that is inactive with lithium, and a composite of a metal alloyable with lithium and metal nitrate that is inactive with lithium, but embodiments of the present disclosure are not limited thereto. The metallic negative active material may include, for example, a silicon-based active material, a tin-based active material, a silicon-tin alloyable active material, or a silicon-carbonaceous active material, but embodiments of the present disclosure are not limited thereto. As used herein, the term "metal alloyable with lithium" includes both metals and semi-metals (i.e., metalloids) that are alloyable with lithium, unless clearly indicated otherwise.

Examples of the metal or semi-metal alloyable with lithium may include Si, Sn, Al, Ge, Pb, Bi, Sb, a Si—X alloy (wherein X is an alkali metal, an alkali earth metal, a Group 13 element, a Group 14 element, a transitional metal, a rare earth element, or a combination thereof, and X is not Si), and Sn—Y' alloy (wherein Y' is an alkali metal, an alkali earth metal, a Group 13 element, a Group 14 element, a transitional metal, a rare earth element, or a combination thereof, and Y' is not Sn). X and Y' may each independently be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), combinations thereof.

The composite of carbon and the metal alloyable with lithium may be, for example, an alloy or a composite, represented by Formula $Si_xSn_qM_yC_z$ (wherein q, x, y, and z each indicate an atomic percent value, (a) (q+x)>2y+z; (b) x, y and z may each independently be greater than 0; (c) q may be greater than 0; and (d) M may be represented by Mn, Mo, Nb, W, Ta, Fe, Cu, Ti, V, Cr, Ni, Co, Zr, Y, or combinations thereof).

The composite of the metal alloyable with lithium and the metal that is inactive with lithium may be, for example, an alloy or a composite, represented by Formula $Si_xM_yAl_z$ (wherein, x, y, and z each indicate an atomic percent value, (a) x+y+z=100, (b) 55$x$<100, (c) 0<y<22, (d) 0<z<100, and (e) M may be Mn, Mo, Nb, W, Ta, Fe, Cu, Ti, V, Cr, Ni, Zr, Y, or combinations thereof).

The transition metal oxide may be, for example, a lithium titanium oxide, a vanadium oxide, or a lithium vanadium oxide.

The non-transition metal oxide may be, for example, $SnO_2$ or $SiO_x$ (wherein 0<x<2).

The carbonaceous material oxide may be, for example, crystalline carbon, amorphous carbon, or combinations thereof, Examples of the crystalline carbon may include graphite, such as natural graphite or artificial graphite that are in shapeless, plate, flake, spherical, or fibrous form, and examples of the amorphous carbon are soft carbon (carbon sintered at low temperatures), hard carbon, meso-phase pitch carbides, and sintered cokes.

The conducting agent and the binder used for the negative active material composition may be the same as or selected from those used for the positive active material composition.

Amounts of the negative active material, the conducting agent, the binder, and the solvent may be the same levels generally used in the art for lithium batteries. At least one of the conducting agent, the binder, and the solvent may be omitted according to the use and the structure of the lithium battery.

In the negative active material composition, water may be used as the solvent. In one embodiment, the negative electrode may use water as the solvent, CMC, SBR, an acrylate-based polymer, and/or a methacrylate-based polymer may be used as the binder, and carbon black, acetylene black, and/or graphite may be used as the conducting agent. In one or more embodiments, to prepare the negative electrode, 94 wt % of the negative active material, 3 wt % of the binder, and 3 wt % of the conducting agent may be mixed in powder form, and then, water may be added to the mixture so that a solid content thereof is about 70 wt %. A slurry may be prepared therefrom, and the slurry may be coated, dried, and rolled to prepare the negative electrode.

A thickness of the negative electrode current collector may be, for example, about 3 um to about 50 um. The negative electrode current collector is not particularly limited, so long as it has high electrical conductivity without causing any chemical change in the lithium battery. The negative electrode current collector may be, for example, stainless steel, aluminum, nickel, titanium, calcined carbon, or the like; aluminium or stainless steel that is surface-treated with carbon, nickel, titanium, silver, or the like; or an aluminum-cadmium alloy. In addition, in the same manner as in the positive electrode current collector, the negative electrode current collector may have a surface on which irregularities are formed, to thereby enhance the adhesive strength of the positive active material. The negative electrode current collector may be used in a suitable form including films, sheets foils, nets, porous structures, foams, non-woven fabrics, and the like.

In one embodiment, the negative electrode may further include the copolymer represented by one of Formulae 1 to 8 and/or the polymer electrolyte including the co polymer and the lithium salt. As the negative electrode further includes the copolymer and/or the polymer electrolyte, lithium ions may be more easily transferred into the positive electrode, thereby further reducing the internal resistance and/or the interface resistance of the negative electrode.

Next, a separator to be disposed between the positive electrode and the negative electrode is prepared.

The separator for the lithium battery may be any separator that is commonly used in lithium batteries. For example, the separator may have low resistance to migration of ions in an electrolyte and have an excellent electrolyte-retaining ability. Examples of the separator may include glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good electrolytic solution-retaining ability may be used for a lithium ion polymer battery.

The separator may be manufactured in the following manner.

In one embodiment, a polymer resin, a filler, and a solvent may be mixed together to prepare a separator composition. Then, the separator composition may be directly coated on an electrode, and then dried to form the separator. In one or more embodiments. the separator composition may be cast on a support and then dried to form a separator film, which may then be separated from the support and laminated on an electrode to form the separator.

The polymer resin used to manufacture the separator is not particularly limited, and any material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate, and a mixture thereof.

Then, as the electrolyte between the positive electrode and the negative electrode, the above-mentioned polymer electrolyte is prepared.

In one embodiment, the electrolyte may include at least one selected from a non-aqueous electrolyte solution, an organic solid electrolyte, and an inorganic solid electrolyte, in addition to the polymer electrolyte.

The non-aqueous electrolyte solution may be, for example, prepared by dissolving the lithium salt in an organic solvent.

For use as the organic solvent, any solvent available as an organic solvent in the art may be used. The organic solvent may be, for example, propylene carbonate, ethylene carbonate, fluoroethylene carbonate, butylene carbonate, dimethyl carbonate, diethyl carbonate, methylethyl carbonate, methylpropyl carbonate, butylene carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, dimethyl carbonate, methylisopropyl carbonate, succinonitrile, diethyl glycol, dimethyl ether, tetraethylene glycol, dimethyl ether, dimethyl ether, triethyl glycol dimethyl ether, polyethyl glycol dimethyl ether, ethylpropyl carbonate, dipropyl carbonate, dibutyl carbonate, diethylene glycol, dimethylether, or a mixture thereof. For use as the lithium salt, any lithium salt available in the art may be used, and examples thereof may include $LiPF_6$, $LiBF_4$, $LiSbFe$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a mixture thereof.

Examples of the organic solid electrolyte may include a polyethylene derivative, a polyethylene oxide derivative, a polypropylene oxide derivative, a phosphorus ester polymer, polyester sulfide, polyvinyl alcohol, polyvinyl fluoride, a polymer including an ionic dissociable group, and the like.

The inorganic solid electrolyte may include at least one of $Li_3N$, LiI, $Li_5NI_2$, $Li_3N$—LiI—LiOH, $LiSiO_4$, $Li_2SiS_3$, $Li_4SiO_4$, $Li_3PO_4$—$Li_2S$—$SiS_2$, lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $Li_{1+x+y}(Al, Ga)_x(Ti, Ge)_{2-x}Si_yP_{3-y}O_{12}$ (0≤x≤1, 0≤y≤1), lithium lanthanum titanate ($Li_xLa_yTiO_3$, 0<x<2, 0<y<3), lithium germanium thiophosphate (LixGeyPzSw, 0<x<4, 0<y<1, 0<z<1, 0<w<5), lithium nitride ($Li_xN_y$, 0<x<4, 0<y<2), $SiS_2$($Li_xSi_yS_z$, 0<x<3, 0<y<2, 0<z<4)-based glass, $P_2S_5$($Li_xP_yS_z$, 0<x<3, 0<y<3, 0<z<7)-based glass, $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, and Garnet-based ceramics such as $Li_{3+x}La_3M_2O_{12}$(0≤x≤5, M=Te, Nb, or Zr).

Figure 3:
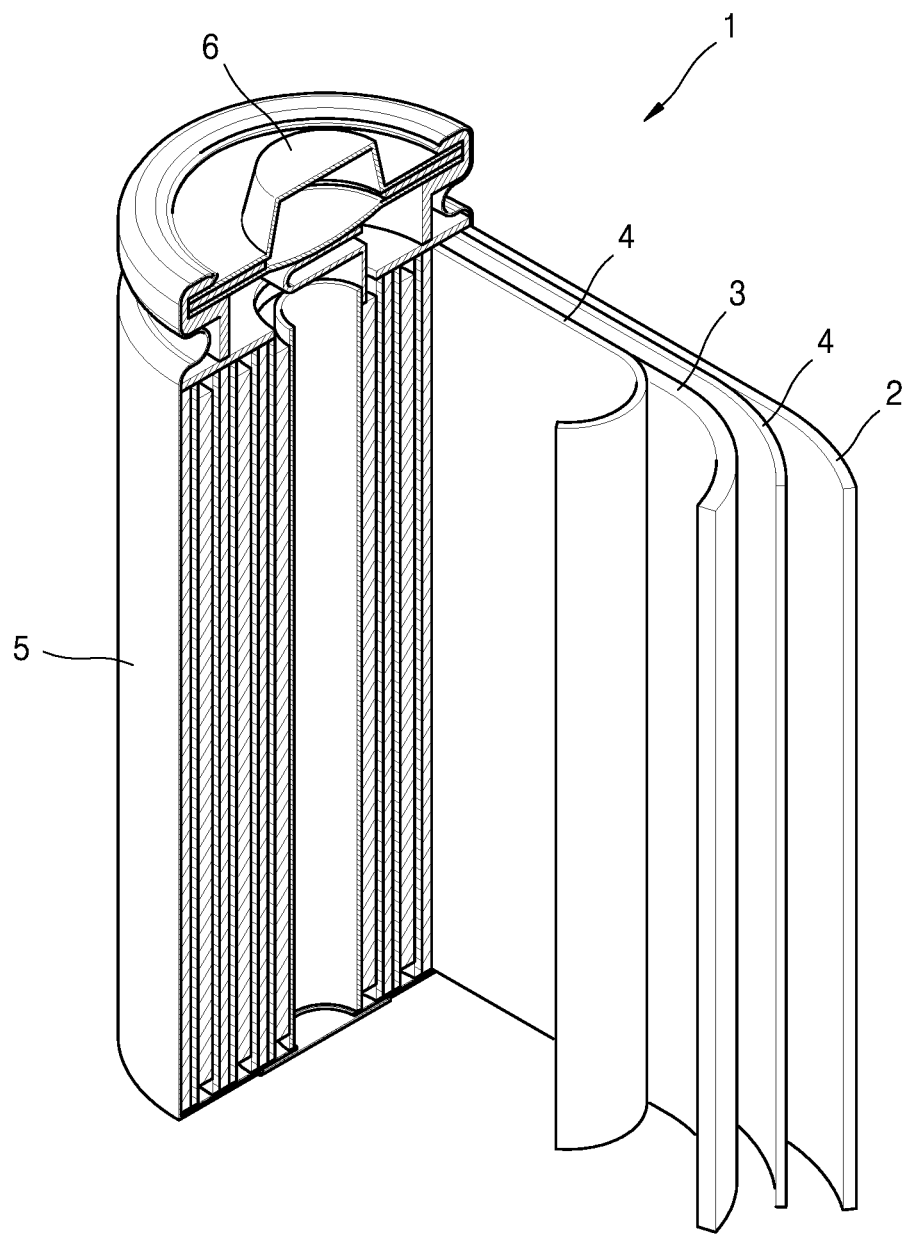
FIG. 3 is a schematic view of a lithium battery according to an embodiment.

Referring to FIG. 3, a lithium battery 1 includes a positive electrode 3, a negative electrode 2, and a separator 4. In one embodiment, the positive electrode 3, the negative electrode 2, and the separator 4 may be wound or folded, and then sealed in a battery case 5. In one or more embodiments, the battery case 5 may be filled with an electrolytic solution and sealed with a cap assembly 6, thereby completing the manufacture of the lithium battery 1. In one or more embodiments, the battery case 5 may be a cylindrical type, or although not illustrated, may be a rectangular type or a thin-film type. For example, the lithium battery 1 may be a lithium ion battery. In one or more embodiments, the lithium battery 1 may be large thin-film battery or a lithium ion battery. In one or more embodiments, the separator may be disposed between the positive electrode and the negative electrode to form a battery assembly. In some embodiments, the battery assembly may be stacked in a bi-cell structure and impregnated with the electrolytic solution. Then, the resultant assembly may be put into a pouch and sealed, thereby completing the manufacture of a lithium ion polymer battery. In addition, a plurality of battery assemblies may be stacked to form a battery pack, which may be used in any device that requires high capacity and high output, for example, in a laptop computer, a smart phone, or an electric vehicle. The lithium battery may be used in, for example, power tool powered by an electric motor; an electric vehicle (EV), for example, in a hybrid vehicle such as a plug-in hybrid electric vehicle (PHEV); an electric two-wheel vehicle such as a bicycle (E-bike) and an electric motor scooter (E-scooter); an electric golf cart; an electric power storage system, but embodiments of the present disclosure are not limited thereto.

According to another aspect of the present disclosure, a method of preparing the copolymer includes: mixing a first monomer including an alkylene oxide repeating unit, a second monomer including an ester group, and an initiator including an alkylene oxide repeating unit, so as to obtain a mixture; and reacting the first monomer, the second monomer, and the initiator to obtain a copolymer. In the method of preparing the copolymer, the first monomer may be represented by Formula 1d, the second monomer may be represented by Formula 1e, and the initiator may be represented by Formula 1f:

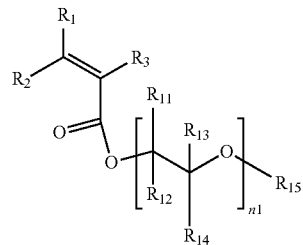

Formula 1d

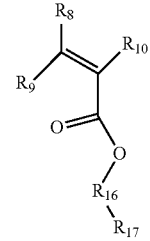

Formula 1e

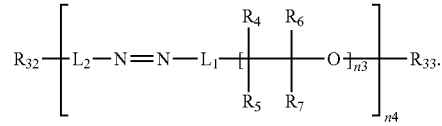

Formula 1f

In Formulae 1d to 1f, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{17}$ may each independently be a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, Rue may be a covalent bond; a linear or branched $C_1$-$C_{10}$ alkylene group that is unsubstituted or substituted with halogen; -($-R_a$—O—$)_k$—, wherein k may be an integer of 2 to 100, and $R_a$ may be a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group including any combination of the foregoing groups, $R_{32}$ and $R_{33}$ may each independently be a hydrogen atom or a $C_1$-$C_{10}$ alkyl group, $L_1$ may be a covalent bond or —$R_b$—C(=O)—O—, $L_2$ may be a covalent bond or —C(=O)—$R_c$—, wherein $R_b$ and $R_c$ may each independently be a linear or branched $C_1$-$C_{20}$ alkylene group, n1 may be an integer of 2 to 100, n3 may be an integer of 2 to 200, and n4 may be an integer of 1 to 20.

In the method of preparing the copolymer, the initiator may be represented by, for example, Formula 1g:

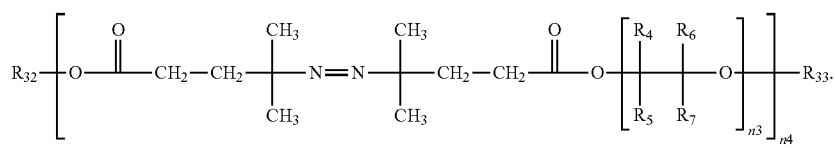

Formula 1g

In Formula 1g, $R_4$, $R_5$, $R_6$, and $R_7$ may each independently be a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, $R_{32}$ and $R_{33}$ may each independently be a hydrogen atom or a $C_1$-$C_{10}$ alkyl group, n3 may be an integer of 2 to 200, and n4 may be an integer of 1 to 20.

In the method of preparing the copolymer, the first monomer, the second monomer, and the initiator including the alkylene oxide repeating unit may be mixed in an organic solvent, such as tetrahydrofuran, and the mixture was allowed for a reaction at a temperature in a range of about 50° C. to about 100° C. for about 1 hour to about 200 hours, thereby completing the preparation of the copolymer.

In the present specification, substituents may be derived by replacing one or more hydrogen atoms with other atoms or functional groups in an unsubstituted mother group. In other words, when a functional group is "substituted", it is meant that such a functional group is substituted with at least one substituent selected from a halogen, a $C_1$-$C_{40}$ alkyl group, a $C_2$-$C_{40}$ alkenyl group, a $C_2$-$C_{40}$ alkynyl group, a $C_3$-$C_{40}$ cycloalkyl group, a $C_3$-$C_{40}$ cycloalkenyl group, and a $C_6$-$C_{40}$ aryl group. When a functional group is described as "selectively substituted", it is meant that such a functional group is able to be substituted with the above-mentioned substituent.

In the present specification, a and b in the expression "$C_a$ to $C_b$" used herein each refer to the number of carbon atoms of a specific functional group. That is, such a functional group includes carbon atoms in the number of a to b. For example, "a $C_1$-$C_4$ alkyl group" refers to an alkyl group having 1 to 4 carbon atoms, and examples thereof are $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, and $(CH_3)_3C$—.

The nomenclature for a particular group or substituent includes both a monovalent radical and a divalent radical depending on the context. For example, if a substituent requires two connection points for the rest of the molecules, such a substituent should be understood as a divalent radical. For example, a substituent specified as an alkyl group requiring two connection points for the rest of the molecules may be a divalent radical, such as —$CH_2$—, —$CH_2CH_2$—, and —$CH_2CH(CH_3)CH_2$—. The nomenclature that specifies a divalent radical, such as "alkylene", clearly indicates that the radical is a divalent radical.

In the present specification, the term "alkyl group" or "alkylene" as used herein refers to a branched or unbranched aliphatic hydrocarbon group. In one embodiment, the alkyl group may be or may not be substituted. Examples of the alkyl group may include a methyl group, an ethyl group, a propyl group, an isopropyl group, a butyl group, a tert-butyl group, a pentyl group, and a hexyl group, but embodiments of the present disclosure are not limited thereto. Each of these examples may be or may not be selectively substituted. A $C_1$-$C_6$ alkyl group may be, for example, methyl, ethyl, propyl, isopropyl, butyl, iso-butyl, sec-butyl, pentyl, 3-pentyl, or hexyl, but embodiments of the present disclosure are not limited thereto.

In the present specification, the term "alkenyl group" as used herein refers to a hydrocarbon group including at least one carbon-carbon double bond and 2 to 20 carbon atoms, and examples thereof may include an ethenyl group, a 1-propenyl group, a 2-propenyl group, a 2-methyl-1-propeyl group, a 1-butenyl group, and a 2-butenyl group, but embodiments of the present disclosure are not limited thereto. In one embodiment, the alkenyl group may be or may not be substituted. In one or more embodiments, the alkenyl group may include 2 to 20 carbon atoms.

In the present specification, the term "alkynyl group" as used herein refers to a hydrocarbon group including at least one carbon-carbon triple bond and 2 to 20 carbon atoms, and examples thereof may include an ethynyl group, a 1-propynyl group, a 1-butynyl group, and a 2-butynyl group, but embodiments of the present disclosure are not limited thereto. In one embodiment, the alkynyl group may be or may not be substituted. In one or more embodiments, the alkynyl group may include 2 to 20 carbon atoms.

In the present specification, the term "cycloalkyl group" or "cycloalkylene" as used herein refers to a cyclic alkyl group having one or more completely saturated carbocyclic rings or a ring system. Examples of the cycloalkyl group may include cyclopropyl, cyclobutyl, cyclopentyl, and cyclohexyl. The term "cycloalkylene" refers to a divalent cycloalkyl group.

In the present specification, the expression "aliphatic" as used herein is used to describe a chain or chain system other than a ring or ring system having a conjugated pi electron system, and may be used for an aliphatic carbocyclic group (for example, a cyclohexyl group).

In the present specification, the expression "aromatic" as used herein is used to describe a ring or ring system having a conjugated pi electron system, and may be used for an aromatic carbocyclic group (for example, a phenyl group) and an aromatic heterocyclic group (for example, pyridine). This expression may be also used for a monocyclic ring or a fused polycyclic ring (i.e., a ring that shares adjacent pairs of atoms) if the whole ring system is aromatic.

In the present specification, the term "aryl group" as used herein refers to an aromatic ring of which a ring skeleton includes carbon atoms only, a ring system (i.e., two or more fused rings that share two adjacent carbon atoms), or a plurality of aromatic rings that are connected to each other via a single bond, —O—, —S—, —C(=O)—, —S(=O)$_2$—, —Si(Ra)(Rb)— (wherein Ra and Rb are each independently a $C_1$-$C_{10}$ alkyl group), a $C_1$-$C_{10}$ alkylene group that is unsubstituted or substituted with halogen, or —C(=O)—NH—. When the aryl group is a ring system, each ring of the ring system is aromatic. Examples of the aryl group may include a phenyl group, a biphenyl group, a naphthyl group, a phenanthrenyl group, and a naphthacenyl group, but embodiments of the present disclosure are not limited thereto. The aryl group may be or may not be substituted.

In the present specification, the term "arylene group" as used herein refers to an aryl group requiring two or more connection points. A tetravalent arylene group refers to an aryl group requiring four connection points, and a divalent arylene group refers to an aryl group requiring two connection points. An example of the arylene group may include —C$_6$H$_5$—O—C$_6$H$_5$—.

In the present specification, the term "heteroaryl group" as used herein refers to an aromatic ring system having a single ring, a plurality of fused rings, or a plurality of rings connected to each other via a single bond, —O—, —S—, —C(=O)—, —S(=O)$_2$—, —Si(Ra)(Rb)— (wherein Ra and Rb are each independently C$_1$-C$_{10}$ alkyl group), a C$_1$-C$_{10}$ alkylene group that is unsubstituted or substituted with a halogen, or —C(=O)—NH—, wherein at least one ring atom is not a carbon atom, but a heteroatom. In the fused ring system, at least one heteroatom may be present in only one ring. For example, the heteroatom may include oxygen, sulfur, and nitrogen, but embodiments of the present disclosure are not limited thereto. Examples of the heteroaryl group may include a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group, but embodiments of the present disclosure are not limited thereto.

In the present specification, the term "heteroarylene group" as used herein refers to a heteroaryl group requiring two or more connection points. A tetravalent heteroarylene group refers to a heteroaryl group requiring four connection points, and a divalent heteroarylene group refers to a heteroaryl group requiring two connection points.

In the present specification, the term "halogen" as used herein refers to a stable element belonging to Group 17 of the Periodic Table of the Elements, and examples of the halogen may include fluorine, chlorine, bromine, iodine, and the like. In particular, the halogen may be fluorine and/or chlorine.

The number average molecular weight (Mn) of the copolymer and/or other components may be measured by gel permeation chromatography (GPC) on a polystyrene standard sample.

Hereinafter, one or more exemplary embodiments of the present disclosure will be described in detail with reference to the following Examples. However, these Examples are illustrative examples of embodiments and are not intended to otherwise limit the scope of the one or more embodiments of the present disclosure.

EXAMPLES

Preparation of Polymer

Example 1: Synthesis of Copolymer of POEA:PEO(2k):EEEA (30:1:60)

20.43 parts by weight of a first monomer, which is polyethylene glycol 400 monomethylether acrylate (POEA, Mn=454 Da, HanNong Chemical Co., Ltd), 16.95 parts by weight of a second monomer, which is 2-(2-ethoxyethoxy) ethyl acrylate (EEEA, Mn=188.22 Da, HanNong Chemical Co., Ltd), and 3 parts by weight of a Macro azo initiator (MAI), which contains polyethylene glycol (PEG2000) (VPE-0201, Wako Chemical Industries, Japan), were added to 100 parts by weight of a solvent, which is tetrahydrofuran (THF), and then, completely dissolved therein by stirring, thereby obtaining a mixed solution. The mixed solution was added to a three-necked flask for polymerization at a temperature of 70° C. for 48 hours under a N$_2$ gas atmosphere, thereby obtaining a copolymer. As a result of gel permeation chromatography (GPC) of the obtained copolymer, a number average molecular weight (Mn) of the copolymer was about 5,512 Dalton, a weight-average molecular weight (Mw) of the copolymer was about 11,090 Dalton, and polydispersity index (PDI) of the copolymer was about 2.01.

Here, a molar ratio of the first monomer-derived repeating unit: the initiator-derived repeating unit: the second monomer-derived repeating unit was 30:1:60. Alternatively, considering the one initiator-derived repeating unit of PEG2000 corresponds to about 50 repeating units of EO(ethylene oxide), the mole ratio can be described as about 30:50:60.

Example 2: Synthesis of Copolymer of POEA:PEO(2k):EEEA (20:1:40)

A copolymer was prepared in the same manner as in Example 1, except that 13.62 parts by weight of POEA (Mn=454, HanNong Chemical Co., Ltd) was used as the first monomer, and 11.3 parts by weight of EEEA (Mn=188.22, HanNong Chemical Co., Ltd) was used as the second monomer. As a result of GPC of the obtained copolymer, a number average molecular weight Mn of the copolymer was about 5,736 Dalton, a weight-average molecular weight Mw of the copolymer was about 10,640 Dalton, and PDI of the copolymer was about 1.85.

Here, a molar ratio of the repeating unit derived from the first monomer: the repeating unit derived from the initiator: the repeating unit derived from the second monomer was 20:1:40. Alternatively, considering the one initiator-derived repeating unit of PEG2000 corresponds to about 50 repeating units of EO(ethylene oxide), the mole ratio can be described as about 20:50:40.

Example 3: Synthesis of Copolymer of POEA:PEO(2k):TFEA (30:1:60)

20.43 parts by weight of a first monomer, which is POEA (Mn=454 Da, HanNong Chemical Co., Ltd), 13.86 parts by weight of a second monomer, which is 2,2,2-trifluoroethyl acrylate (TFEA, Mn=154.09 Da, TCI), and 3 parts by weight of MAI, which contains PEG2000 (VPE-0201, Wako Chemical Industries, Japan), were added to 100 parts by weight of a solvent, which is THF, and then, completely dissolved therein by stirring, thereby obtaining a mixed solution. The mixed solution was added to a three-necked flask for polymerization at a temperature of 70° C. for 48 hours under a N$_2$ gas atmosphere, thereby obtaining a copolymer. As a result of GPC of the obtained copolymer, a number average molecular weight Mn of the copolymer was about 3,352 Dalton, a weight-average molecular weight Mw of the copolymer was about 6,662 Dalton, and PDI of the copolymer was about 1.99.

Here, a molar ratio of the repeating unit derived from the first monomer: the repeating unit derived from the initiator: the repeating unit derived from the second monomer was 30:1:60. Alternatively, considering the one initiator-derived repeating unit of PEG2000 corresponds to about 50 repeating units of EO(ethylene oxide), the mole ratio can be described as about 30:50:60.

Example 4: Synthesis of Polymer of POEA:PEO(2k):TFEA (15:1:30)

A copolymer was prepared in the same manner as in Example 3, except that 10.22 parts by weight of POEA (Mn=454 Da, HanNong Chemical Co., Ltd) was used as the first monomer, and 6.93 parts by weight of TFEA (Mn=154.09 Da, TCI) was used as the second monomer. As a result of GPC of the obtained copolymer, a number average molecular weight Mn of the copolymer was about 3,840 Dalton, a weight-average molecular weight Mw of the copolymer was about 8,121 Dalton, and PDI of the copolymer was about 2.11.

Here, a molar ratio of the repeating unit derived from the first monomer: the repeating unit derived from the initiator: the repeating unit derived from the second monomer was 15:1:30. Alternatively, considering the one initiator-derived repeating unit of PEG2000 corresponds to about 50 repeating units of EO(ethylene oxide), the mole ratio can be described as about 15:50:30.

Example 5: Synthesis of Copolymer of POEA:PEO(2k):TFEA (20:1:40)

A copolymer was prepared in the same manner as in Example 3, except that 13.62 parts by weight of POEA (Mn=454 Da, HanNong Chemical Co., Ltd) was used as the first monomer, and 9.24 parts by weight of TFEA (Mn=154.09 Da, TCI) was used as the second monomer. As a result of GPC of the obtained copolymer, a number average molecular weight Mn of the copolymer was about 3,263 Dalton, a weight-average molecular weight Mw of the copolymer was about 6,772 Dalton, and PDI of the copolymer was about 2.08.

Here, a molar ratio of the repeating unit derived from the first monomer: the repeating unit derived from the initiator: the repeating unit derived from the second monomer was 20:1:40. Alternatively, considering the one initiator-derived repeating unit of PEG2000 corresponds to about 50 repeating units of EO(ethylene oxide), the mole ratio can be described as about 20:50:40.

Example 6: Synthesis of Copolymer of POEA:PEO(2k):HFPA (40:1:50)

27.24 parts by weight of a first monomer, which is POEA (Mn=454 Da, HanNong Chemical Co., Ltd), 16.64 parts by weight of a second monomer, which is 1,1,1,3,3,3-hexafluoroisopropyl acrylate (HFPA, Mn=222.09 Da, TCI), and 3 parts by weight of MAI, which contains PEG2000, were added to 100 parts by weight of a solvent, which is THF, and then, completely dissolved therein by stirring, thereby obtaining a mixed solution. The mixed solution was added to a three-necked flask for polymerization at a temperature of 70° C. for 48 hours under a $N_2$ gas atmosphere, thereby obtaining a copolymer. As a result of GPC of the obtained copolymer, a number average molecular weight Mn of the copolymer was about 2,580 Dalton, a weight-average molecular weight Mw of the copolymer was about 4,475 Dalton, and PDI of the copolymer was about 1.73.

Here, a molar ratio of the repeating unit derived from the first monomer: the repeating unit derived from the initiator: the repeating unit derived from the second monomer was 40:1:50. Alternatively, considering the one initiator-derived repeating unit of PEG2000 corresponds to about 50 repeating units of EO(ethylene oxide), the mole ratio can be described as about 40:50:50.

Example 7: Synthesis of Copolymer of POEA:PEO(2k):OFPA (20:1:40)

13.62 parts by weight of a first monomer, which is POEA (Mn=454 Da, HanNong Chemical Co., Ltd), 17.16 parts by weight of a second monomer, which is 2,2,3,3,4,4,5,5-octafluoropentyl acrylate (OFPA, Mn=286.12 Da, Sigma Aldrich), and 3 parts by weight of MAI, which contains PEG2000, were added to 100 parts by weight of a solvent, which is THF, and then, completely dissolved therein by stirring, thereby obtaining a mixed solution. The mixed solution was added to a three-necked flask for polymerization at a temperature of 70° C. for 48 hours under a $N_2$ gas atmosphere, thereby obtaining a copolymer. As a result of GPC of the obtained copolymer, a number average molecular weight Mn of the copolymer was about 5,533 Dalton, a weight-average molecular weight Mw of the copolymer was about 8,228 Dalton, and PDI of the copolymer was about 1.49.

Here, a molar ratio of the repeating unit derived from the first monomer: the repeating unit derived from the initiator: the repeating unit derived from the second monomer was 20:1:40. Alternatively, considering the one initiator-derived repeating unit of PEG2000 corresponds to about 50 repeating units of EO(ethylene oxide), the mole ratio can be described as about 20:50:40.

Comparative Example 1: PEO 6000

PEO 6000 (Mn=6,000 Dalton, Sigma) was Obtained and Used as is.
Preparation of Polymer Electrolyte

Example 8: LiTFSI 0.6M+LiBOB 0.4M Polymer Electrolyte

The copolymer prepared according to Example 1 was melted by heating, and LiTFSI (LiN(SO$_2$CF$_3$)$_2$, lithium bis(tri-fluoromethane sulphonyl) imide, Sigma) 0.6 M, and LiBOB (LiB(C$_2$O$_4$)$_2$, lithium bis(oxalato)borate, Sigma) 0.4 M were added thereto to completely dissolve the copolymer. The resulting product was cooled, thereby preparing a polymer electrolyte. The prepared polymer electrolyte showed a liquid state at a temperature of 20° C.

Examples 9 to 14: Polymer Electrolyte (LiTFSI 0.6M+LiBOB 0.4M)

A polymer electrolyte was prepared in the same manner as in Example 8, except that the copolymers prepared according to Examples 2 to 7 were each used instead of the copolymer prepared according to Example 1. The prepared polymer electrolytes all showed a liquid state at a temperature of 20° C.

Comparative Example 2: Polymer (PEG 6000) Electrolyte (LiTFSI 0.6M+LiBOB 0.4M)

A polymer electrolyte was prepared in the same manner as in Example 1, except that the copolymer prepared according to Comparative Example 1 was used instead of the copolymer prepared according to Example 1. The prepared polymer electrolyte showed a liquid state at a temperature of 20° C.

Preparation of a Lithium Battery

Example 15: Preparation of a Lithium Battery Including the Polymer Electrolyte

Preparation of a Positive Electrode

A $LiNi_{1/3}Co_{1/3}Mn_{1/3}O_2$ composite positive active material, a carbonaceous conducting agent (Denka Black), and polyvinylidene fluoride (PVdF) were mixed at a weight ratio of 92:4:4, and the mixture was mixed again with N-methylpyrrolidone (NMP) in an agar mortar to prepare a slurry. The slurry was bar-coated on an aluminum current collector having a thickness of 15 μm, dried at room temperature, dried again under vacuum at a temperature of 120□, and then, rolled under pressure and punched, thereby preparing a positive electrode plate having a thickness of 55 μm.

Preparation of a Coin Cell

A 2032 coin cell was prepared by using the prepared positive electrode plate, lithium metal foil as a counter electrode, and the polymer electrolyte prepared according to Example 8 between the positive electrode plate and the counter electrode. The whole process of battery fabrication was performed in a glove box in an Ar atmosphere.

Examples 16 to 21: Lithium Battery Including the Polymer Electrolyte

A coin cell was prepared in the same manner as in Example 15, except that the polymer electrolytes prepared according to Examples 9 to 14 were each used instead of the polymer electrolyte prepared according to Example 8.

Evaluation Example 1: Measurement of Enthalpy of Fusion (ΔHm)

By using a differential scanning calorimeter (DSC), enthalpy of fusion ΔHm of each of the copolymers prepared according to Examples 1 to 7 and Comparative Example 1 was measured from an area of a phase transition peak. In addition, a melting temperature (Tm) of each of the copolymers prepared according to Examples 1 to 7 and Comparative Example 1 was measured. The measurement results are shown in Table 1. Here, the enthalpy of fusion of Comparative Example 1 is the enthalpy of fusion of PEG 6000 having high crystallinity. Degree of Crystallization (DOC) of each of Examples 1 to 7 and Comparative Example 1 was calculated based on the enthalpy of fusion of 100% crystalline PEG (ΔHm=196.8 J/g) disclosed in Polymers for Advanced Technologies, Vol 13, Issue 10-12, Version of Record online: 6 Jan. 2003, which is incorporate herein by reference.

TABLE 1

|  | Melting temperature (Tm) [° C.] | Enthalpy of fusion [J/g] | Degree of Crystallization (DOC) [%] |
| --- | --- | --- | --- |
| Example 1 | 34.0 | 4.58 | 2.33 |
| Example 2 | 34.1 | 6.87 | 3.49 |
| Example 3 | 34.7 | 5.06 | 2.57 |
| Example 4 | 35.2 | 18.10 | 9.20 |
| Example 5 | 34.0 | 6.82 | 3.47 |
| Example 6 | 34.0 | 5.11 | 2.60 |
| Example 7 | 32.4 | 5.80 | 2.95 |

TABLE 1-continued

|  | Melting temperature (Tm) [° C.] | Enthalpy of fusion [J/g] | Degree of Crystallization (DOC) [%] |
| --- | --- | --- | --- |
| Comparative Example 1 | 60.3 | 176.5 | 89.68 |

As shown in Table 1, it was confirmed that the enthalpy of fusion of each of the copolymers prepared according to Examples 1 to 7 was about 10% or less than that of PEO having 100% crystallinity (ΔHm=196.8 J/g).

In addition, it was confirmed that the enthalpy of fusion of each of the copolymers prepared according to Examples 1 to 7 was significantly lower than that of PEO (i.e., PEG 6000) of Comparative Example 1.

In addition, the melting temperature of each of the copolymers prepared according to Examples 1 to 7 was about 45° C. or less.

Evaluation Example 2: Measurement of Electrical Conductivity of a Polymer Electrolyte The ionic conductivity of each of the polymer electrolytes prepared according to Examples 8 to 14 and Comparative Example 2 was measured according to electrochemical impedance spectroscoty (EIS).

By using a VSP potentionstat (BioLogic Science Instruments, USA), the ionic conductivity was measured with respect to current at an amplitude of 10 millivolts (mV) within a frequency range of about 1 MHz to about 100 mHz (i.e., about 0.1 Hz). During measurement, a symmetric block cell (in the form of SUS|polymer electrolyte|SUS) where a stainless steel (SS) disc was placed on both sides of a stretched polymer electrolyte was used. A thickness of each of the polymer electrolytes prepared according to Examples 8 to 14 was about 150 um, and a thickness of the polymer electrolyte of Comparative Example 2 was about 100 um.

The measurement results are shown in Table 2.

TABLE 2

|  | Ionic conductivity at 20□ [S/cm] | Ionic conductivity at 45□ [S/cm] | Ionic conductivity at 60□ [S/cm] |
| --- | --- | --- | --- |
| Example 8 | $1.82 \times 10^{-5}$ | $1.29 \times 10^{-4}$ | $3.16 \times 10^{-4}$ |
| Example 9 | $8.38 \times 10^{-6}$ | $8.80 \times 10^{-5}$ | $2.51 \times 10^{-4}$ |
| Example 10 | $4.57 \times 10^{-6}$ | $5.26 \times 10^{-5}$ | $1.56 \times 10^{-4}$ |
| Example 11 | $5.10 \times 10^{-6}$ | $5.92 \times 10^{-5}$ | $1.68 \times 10^{-4}$ |
| Example 12 | $2.23 \times 10^{-6}$ | $4.66 \times 10^{-5}$ | $9.75 \times 10^{-5}$ |
| Example 13 | $4.68 \times 10^{-6}$ | $4.36 \times 10^{-5}$ | $8.14 \times 10^{-5}$ |
| Example 14 | $2.38 \times 10^{-6}$ | $2.86 \times 10^{-5}$ | $7.93 \times 10^{-5}$ |
| Comparative Example 2 | $6.80 \times 10^{-7}$ | $2.36 \times 10^{-5}$ | $6.95 \times 10^{-5}$ |

As shown in Table 2, it was shown that the ionic conductivity of each of the polymer electrolytes prepared according to Examples 8 to 14 was improved as compared with that of the polymer electrolyte of Comparative Example 2.

For example, the ionic conductivity of each of the polymer electrolytes prepared according to Examples 8 to 14 at a temperature of 60° C. was at least $7.0 \times 10^{-5}$ Siemens per centimeter (S/cm).

Evaluation Example 3: Linear Sweep Voltammetry (LSV) Measurement

The polymer electrolytes prepared according to Examples 8 to 14 and Comparative Example 2 were subjected to LSV using an electrochemically stable voltage window.

Here, VMP3 potentiostat (BioLogic Science Instruments, USA) was used, and the LSV was performed at a voltage scanning rate of about 0.25 millivolts per second (mV/s). The measurement results are shown in FIG. 1.

In the measurement, an asymmetric block cell (in the form Li|polymer electrolyte|Ni) where a lithium metallic disc and a nickel metallic disc are placed on both sides of a polymer electrolyte was used.

Referring to FIG. 1, the polymer electrolytes of Examples 8, 10, 13, and 14 showed insignificant oxidation current in the voltage range of about 4.0 V to about 4.5 V (vs. Li), thereby confirming electrochemical stability thereof.

However, although not shown in FIG. 1, the polymer electrolyte of Comparative Example 2 showed increased oxidation current at the voltage of 3.8 V or higher, thereby confirming that the polymer electrolyte of Comparative Example 2 was not electrochemically stable.

Evaluation Example 4: Evaluation of Charge/Discharge Characteristics

Lithium batteries (coin cells) including the polymer electrolytes prepared according to Examples 15 to 21 were charged with a constant current of 0.1 C at a temperature of 25° C. until a voltage thereof reached 4.2 V (vs. Li). The completely charged lithium batteries were then rested for 10 minutes, and discharged with a constant current of 0.1 C until a voltage thereof reached 2.85 V (vs. Li). The charge/discharge profiles of the lithium batteries prepared according to Examples 15 and Example 17 are shown in FIG. 2.

Figure 2:
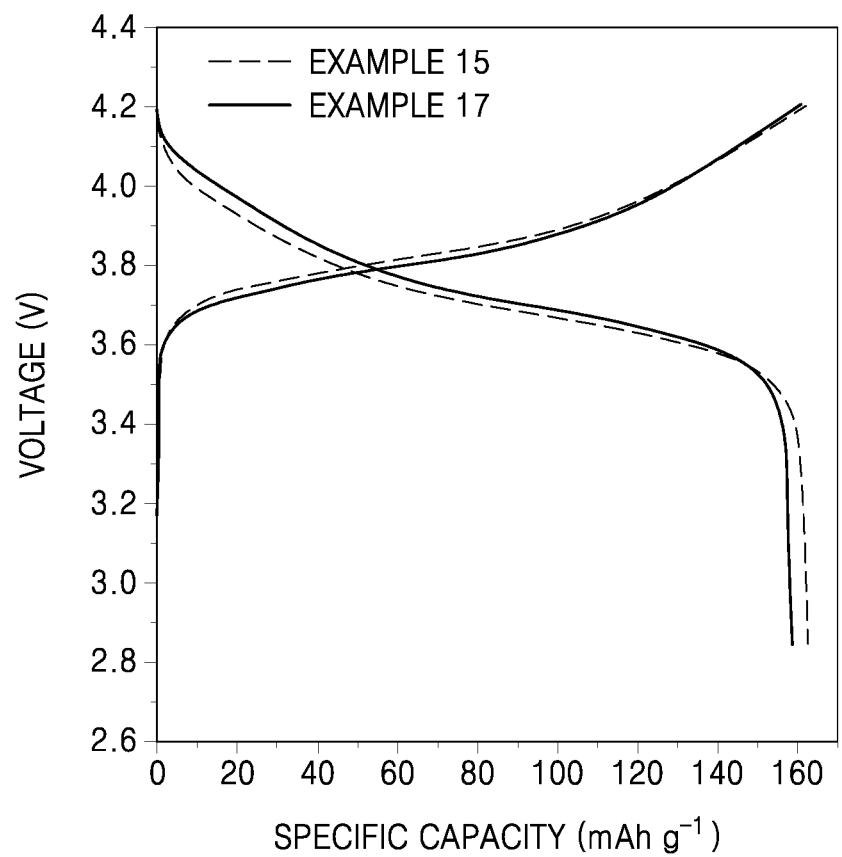
FIG. 2 is a graph of voltage (Volts (V)) versus specific capacity (milliampere hours per gram (mAh/g) showing charge/discharge profiles of lithium batteries prepared according to Examples 15 and 17.

Referring to FIG. 2, it was confirmed that the lithium batteries prepared according to Examples 15 and 17 had stable charge/discharge profiles.

As described above, according to one or more embodiments, a copolymer including an alkylene oxide repeating unit in a main chain and a side chain at the same time and a functional group having oxidation resistance may lead to lower crystallinity of a polymer electrolyte, improved ionic conductivity, and improved high-voltage stability.

It should be understood that embodiments described herein should be considered in a descriptive sense and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A polymer electrolyte comprising:
a copolymer represented by Formula 1; and
a lithium salt:

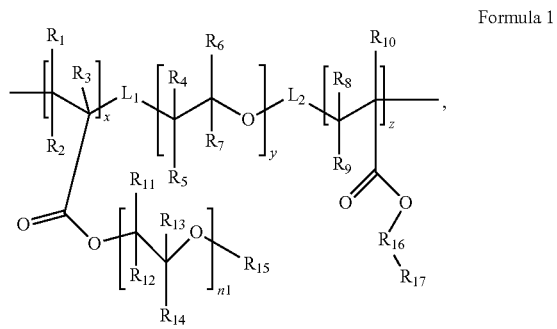

Formula 1 wherein, in Formula 1,
each $R_1$, $R_2$, $R_3$, $R_4$, $R_5$, $R_6$, $R_7$, $R_8$, $R_9$, $R_{10}$, $R_{11}$, $R_{12}$, $R_{13}$, and $R_{14}$, are the same or different, and are each independently a hydrogen atom; a halogen atom; a linear or branched $C_1$-$C_{10}$ alkyl group that is unsubstituted or substituted with halogen; a $C_6$-$C_{10}$ cycloalkyl group that is substituted or unsubstituted with halogen; a $C_2$-$C_{10}$ alkenyl group that is substituted or unsubstituted with halogen; a $C_2$-$C_{10}$ alkynyl group that is substituted or unsubstituted with halogen; a $C_6$-$C_{10}$ aryl group that is substituted or unsubstituted with halogen; or a $C_2$-$C_{10}$ heteroaryl group that is substituted or unsubstituted with halogen,
each $R_{15}$ is the same or different, and is a linear or branched $C_1$-$C_{10}$ alkyl group that is unsubstituted or substituted with halogen; a $C_6$-$C_{10}$ cycloalkyl group that is substituted or unsubstituted with halogen; a $C_2$-$C_{10}$ alkenyl group that is substituted or unsubstituted with halogen; a $C_2$-$C_{10}$ alkynyl group that is substituted or unsubstituted with halogen; a $C_6$-$C_{10}$ aryl group that is substituted or unsubstituted with halogen; or a $C_2$-$C_{10}$ heteroaryl group that is substituted or unsubstituted with halogen,
each $R_{16}$ is the same or different, and is a covalent bond; a $C_1$-$C_{10}$ linear or branched alkylene group that is substituted or unsubstituted with halogen; -($-R_a-$O$-)_k-$, wherein k is an integer of 2 to 100, and $R_a$ is a $C_2$-$C_{10}$ alkylene group that is substituted or unsubstituted with halogen; a $C_6$-$C_{10}$ cycloalkylene group that is substituted or unsubstituted with halogen; a $C_6$-$C_{10}$ arylene group that is substituted or unsubstituted with halogen; a $C_2$-$C_{10}$ heteroarylene group that is substituted or unsubstituted with halogen; or a divalent linking group comprising one or more of the foregoing groups,
each $R_{17}$ is the same or different, and is a halogen atom; a linear or branched $C_1$-$C_{10}$ alkyl group that is unsubstituted or substituted with halogen; a $C_6$-$C_{10}$ cycloalkyl group that is substituted or unsubstituted with halogen; a $C_2$-$C_{10}$ alkenyl group that is substituted or unsubstituted with halogen; a $C_2$-$C_{10}$ alkynyl group that is substituted or unsubstituted with halogen; a $C_6$-$C_{10}$ aryl group that is substituted or unsubstituted with halogen; or a $C_2$-$C_{10}$ heteroaryl group that is substituted or unsubstituted with halogen, $L_1$ is a covalent bond or $-R_b-C(=O)-O-$, and $L_2$ is a covalent bond or $-C(=O)-R_c-$, wherein $R_b$ and $R_c$ are each independently a linear or branched $C_1$-$C_{20}$ alkylene group, n1 is an integer of 2 to 100, and x, y, and z are each mole fractions in repeating units, wherein $0<x<1$, $0<y<1$, $0<z<1$, and $x+y+z=1$.

2. The polymer electrolyte of claim 1, wherein a main chain of the copolymer represented by Formula 1 comprises at least one first block comprising a plurality of first repeating units connected to each other, wherein the first repeating unit is represented by Formula 1a:

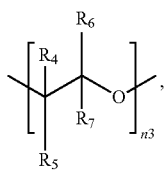

Formula 1a wherein, in Formula 1a, $R_4$, $R_5$, $R_6$, and $R_7$ are each independently a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, and n3 is an integer of 2 to 200.

3. The polymer electrolyte of claim 1, wherein a main chain of the copolymer represented by Formula 1 comprises at least one second block comprising a second repeating unit represented by Formula 1b and a third repeating unit represented by Formula 1c, wherein the second block is a random copolymer:

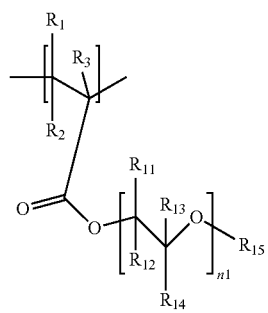

Formula 1b

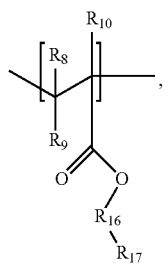

Formula 1c wherein, in Formulae 1b and 1c, $R_1$, $R_2$, $R_3$, $R_8$, $R_9$, $R_{10}$, $R_{11}$, $R_{12}$, $R_{13}$, and $R_{14}$ are each independently a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, and $R_{15}$ is a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, $R_{16}$ is a covalent bond; a linear or branched $C_1$-$C_{10}$ alkylene group that is unsubstituted or substituted with halogen; $-(-R_a-O-)_k-$, wherein k is an integer of 2 to 100, and $R_a$ is a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group comprising one or more of the foregoing groups, and $R_{17}$ is a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen.

4. The polymer electrolyte of claim 1, wherein the copolymer represented by Formula 1 is represented by Formula 2:

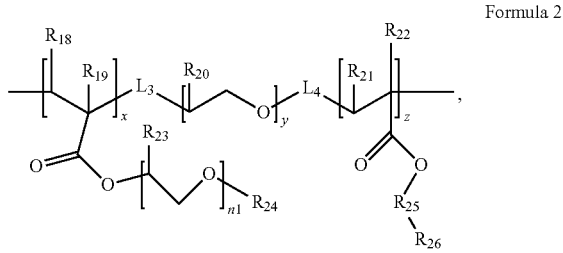

Formula 2 wherein, in Formula 2, each $R_{18}$, $R_{19}$, $R_{20}$, $R_{21}$, $R_{22}$, and $R_{23}$ are the same or different, and are each independently a hydrogen atom; a halogen atom; a linear or branched $C_1$-$C_{10}$ alkyl group that is unsubstituted or substituted with halogen; or a $C_6$-$C_{10}$ cycloalkyl group that is unsubstituted or substituted with halogen, each $R_{24}$ is the same or different, and is a linear or branched $C_1$-$C_{10}$ alkyl group that is unsubstituted or substituted with halogen; or a $C_6$-$C_{10}$ cycloalkyl group that is unsubstituted or substituted with halogen, each $R_{25}$ is the same or different, and is a covalent bond; a linear or branched $C_1$-$C_{10}$ alkyl group that is unsubstituted or substituted with halogen; -($-R_a-O-)_k-$, wherein k is an integer of 2 to 100, and $R_a$ is a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group comprising one or more of the foregoing groups, each $R_{26}$ is a halogen atom; a linear or branched $C_1$-$C_{10}$ alkyl group that is unsubstituted or substituted with halogen; or a $C_6$-$C_{10}$ cycloalkyl group that is unsubstituted or substituted with halogen, $L_3$ is a covalent bond or $-C(CH_3)_2-CH_2CH_2-C(=O)-O-$, $L_4$ is a covalent bond or $-C(=O)-CH_2CH_2-C(CH_3)_2-$, n1 is an integer of 2 to 100, and x, y, and z are each mole fractions in repeating units, wherein $0<x<1$, $0<y<1$, $0<z<1$, and $x+y+z=1$.

5. The polymer electrolyte of claim 1, wherein the copolymer represented by Formula 1 is represented by Formula 3:

Formula 3 wherein, in Formula 3, each $R_{27}$ and $R_{28}$ are the same or different, and are each independently a hydrogen atom; a halogen atom; $-C_nH_{2n+1}$ ($1 \le n \le 10$); $-C_nF_{2n+1}$ ($1 \le n \le 10$); $-C_nF_{2n}H$ ($1 \le n \le 10$); or $-C_nH_n(CF_3)_{n+1}$ ($1 \le n \le 4$), each $R_{29}$ is the same or different, and is $-C_nH_{2n+1}$ ($1 \le n \le 10$); $-C_nF_{2n+1}$ ($1 \le n \le 10$); $-C_nF_{2n}H$ ($1 \le n \le 10$); or $-C_nH_n(CF_3)_{n+1}$ ($1 \le n \le 4$), each $R_{30}$ is the same or different, and is a covalent bond; a linear or branched $C_1$-$C_{10}$ alkylene group that is unsubstituted or substituted with halogen; or -($-R_a-O-)_k-$, wherein k is an integer of 2 to 100, and $R_a$ is a $C_2$-$C_{10}$ alkylene group that is unsubstituted or substituted with halogen, each $R_{31}$ is the same or different, and is a halogen atom; $-C_nH_{2n+1}$ ($1 \le n \le 10$); $-C_nF_{2n+1}$ ($1 \le n \le 10$); $-C_nF_{2n}H$ ($1 \le n \le 10$); or $-C_nH_n(CF_3)_{n+1}$ ($1 \le n \le 4$), $L_3$ is a covalent bond or $-C(CH_3)_2-CH_2CH_2-C(=O)-O-$, $L_4$ is a covalent bond or $-C(=O)-CH_2CH_2-C(CH_3)_2-$, n1 is an integer of 2 to 100, and x, y, and z are each mole fractions in repeating units, wherein $0<x<1$, $0<y<1$, $0<z<1$, and $x+y+z=1$.

6. The polymer electrolyte of claim 1, wherein the copolymer represented by Formula 1 is represented by one of Formulae 4 to 8:

Formula 4

Formula 5

Formula 6

Formual 7

Formual 8 wherein, in Formulae 4 to 8, $L_3$ is a covalent bond or $-C(CH_3)_2-CH_2CH_2-C(=O)-O-$, $L_4$ is a covalent bond or $-C(=O)-CH_2CH_2-C(CH_3)_2-$, n1 and n2 are each an integer of 2 to 100, and x, y, and z are each mole fractions in repeating units, wherein $0<x<1$, $0<y<1$, $0<z<1$, and $x+y+z=1$.

7. The polymer electrolyte of claim 1, wherein $0<x<0.5$, $0.001<y<0.5$, and $0<z<0.75$.

8. The polymer electrolyte of claim 1, wherein the copolymer represented by Formula 1 has an enthalpy of fusion that is about 30% or less of an enthalpy of fusion of a polyethylene oxide having 100% crystallinity, wherein the enthalpy of fusion is obtained by differential scanning calorimetry measurement.

9. The polymer electrolyte of claim 1, wherein the copolymer represented by Formula 1 has a crystallinity that is about 30% or less of a crystallinity of a polyethylene oxide having 100% crystallinity, wherein the crystallinity is obtained by differential scanning calorimetry measurement.

10. The polymer electrolyte of claim 1, wherein the polymer has a melting temperature of about 60° C. or less.

11. The polymer electrolyte of claim 1, wherein the copolymer has a number average molecular weight of about 2,000 Dalton to about 500,000 Dalton.

12. The polymer electrolyte of claim 1, wherein the lithium salt has a concentration of about 0.01 moles per liter to about 5.0 moles per liter, based on a total volume of the polymer electrolyte.

13. The polymer electrolyte of claim 1, wherein the lithium salt comprises at least one of $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, or a compound represented by one of Formulae 9 to 12:

Formula 9
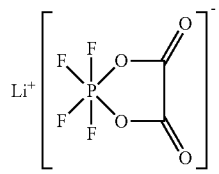

Formula 10
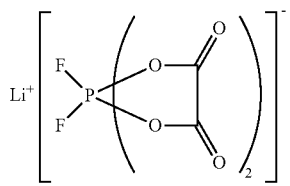

Formula 11
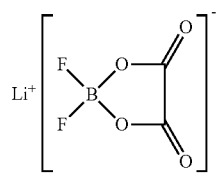

Formula 12
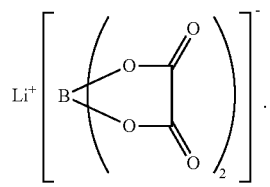

14. The polymer electrolyte of claim 1, wherein the polymer electrolyte is liquid at a temperature of about 45° C. or less.

15. The polymer electrolyte of claim 1, wherein the polymer electrolyte has an ionic conductivity of about $7.5 \times 10^{-5}$ Siemens per centimeter at a temperature of 60° C.

16. The polymer electrolyte of claim 1, wherein the polymer electrolyte is electrochemically stable in a voltage range of about 4.0 volts to about 4.5 volts with respect to lithium.

17. A copolymer represented by Formula 1:

Formula 1
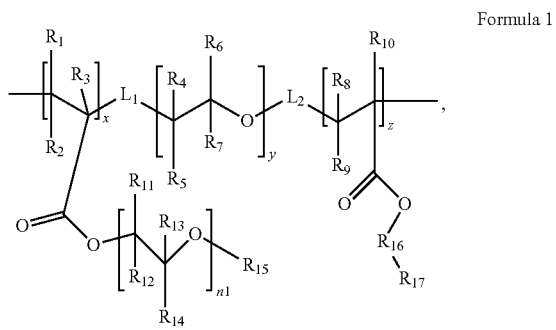

wherein, in Formula 1,
each $R_1$, $R_2$, $R_3$, $R_4$, $R_5$, $R_6$, $R_7$, $R_8$, $R_9$, $R_{10}$, $R_{11}$, $R_{12}$, $R_{13}$, and $R_{14}$ are the same or different, and are each independently a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, each, $R_{15}$, and $R_{17}$ is the same or different, and is a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, each $R_{16}$ is the same or different, and is a covalent bond; a linear or branched $C_1$-$C_{10}$ alkyl group that is unsubstituted or substituted with halogen; or -(—$R_a$—O—)$_k$—, wherein k is an integer of 2 to 100, and $R_a$ is a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group comprising one or more of the foregoing groups, each $R_{17}$ is the same or different, and is a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, $L_1$ is a covalent bond or —$R_b$—C(=O)—O—, and $L_2$ is a covalent bond or —C(=O)—$R_c$, wherein $R_b$ and $R_c$ are each independently a linear or branched $C_1$-$C_{20}$ alkylene group, n1 is an integer of 2 to 100, x, y, and z are each mole fractions in repeating units, wherein 0<x<1, 0<y<1, 0<z<1, and x+y+z=1, and the copolymer has a number average molecular weight of about 2,000 Dalton to about 500,000 Dalton.

18. The copolymer of claim 17, wherein a main chain of the copolymer comprises a first block comprising a plurality of first repeating units connected to each other and represented by Formula 1a, and the main chain of the polymer further comprises a second block comprising a second repeating unit represented by Formula 1b and a third repeating unit represented by Formula 1c, wherein the second block is a random copolymer:

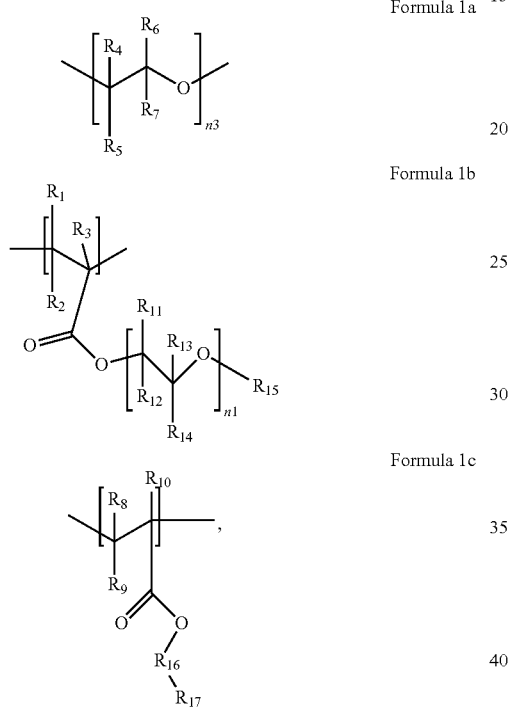

wherein, in Formulae 1a to 1c, $R_1$, $R_2$, $R_3$, $R_8$, $R_9$, $R_{10}$, $R_{11}$, $R_{12}$, $R_{13}$ and $R_{14}$ are each independently a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, $R_{15}$ is a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, $R_{16}$ is a covalent bond; a linear or branched $C_1$-$C_{10}$ alkyl group that is unsubstituted or substituted with halogen; -($R_a$—O—)$_k$—, wherein k is an integer of 2 to 100, and $R_a$ is a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group comprising one or more of the foregoing groups, $R_{17}$ is a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen, and n3 is an integer of 2 to 200.

19. The copolymer of claim 17, wherein the copolymer represented by Formula 1 is represented by one of Formulae 4 to 8:

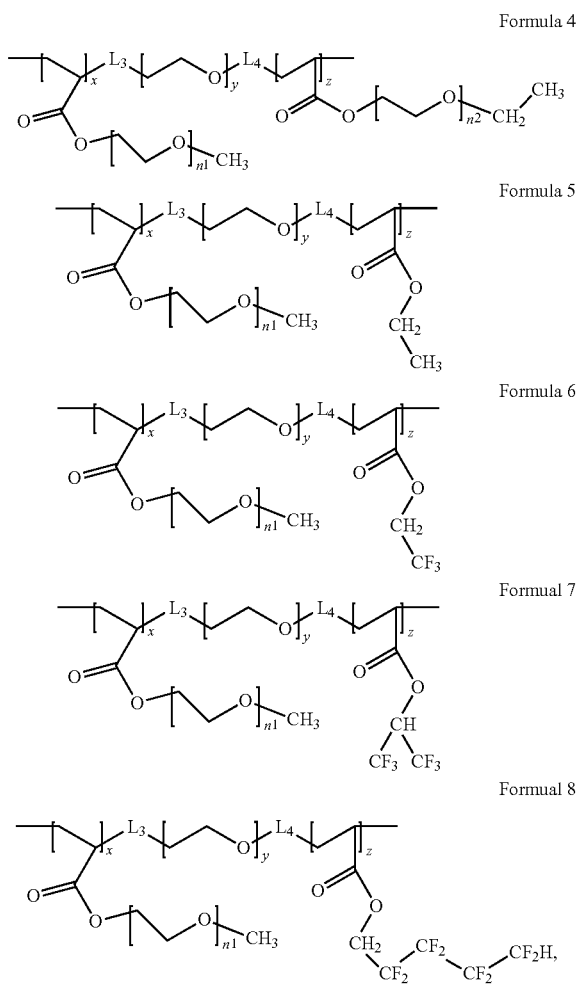

wherein, in Formulae 4 to 8, $L_3$ is a covalent bond or —C(CH$_3$)$_2$—CH$_2$CH$_2$—C(=O)—O—, $L_4$ is a covalent bond or —C(=O)—CH$_2$CH$_2$—C(CH$_3$)$_2$—, n1 and n2 are each independently an integer of 2 to 100,
x, y, and z are each mole fractions in repeating units,
wherein 0<x<1, 0<y<1, 0<z<1, and x+y+z=1, and
the copolymer has a number average molecular weight of about 2,000 Dalton to about 500,000 Dalton.

20. The copolymer of claim 17, wherein the copolymer represented by Formula 1 has enthalpy of fusion that is about 30% or less than an enthalpy of fusion of a polyethylene oxide (PEO) having 100% crystallinity, wherein the enthalpy of fusion is obtained by differential scanning calorimetry measurement, and
wherein the copolymer has a melting temperature of 45° C. or less.

21. An electrochemical device comprising:
a first electrode;
a second electrode; and
an electrolyte disposed between the first electrode and the second electrode,
wherein at least one of the first electrode, the second electrode, and the electrolyte comprises the copolymer of claim 17.

22. The electrochemical device of claim 21, wherein the electrochemical device is a lithium battery, a capacitor, or an electrochromic device.

23. A method of preparing a copolymer, the method comprising:
mixing a first monomer comprising an alkylene oxide repeating unit, a second monomer comprising an ester group, and an initiator comprising an alkylene oxide repeating unit to obtain a mixture; and
reacting the first monomer, the second monomer, and the initiator to obtain the copolymer.

24. The method of claim 23, wherein the first monomer is represented by Formula 1d, the second monomer is represented by Formula 1e, and the initiator is represented by Formula 1f:

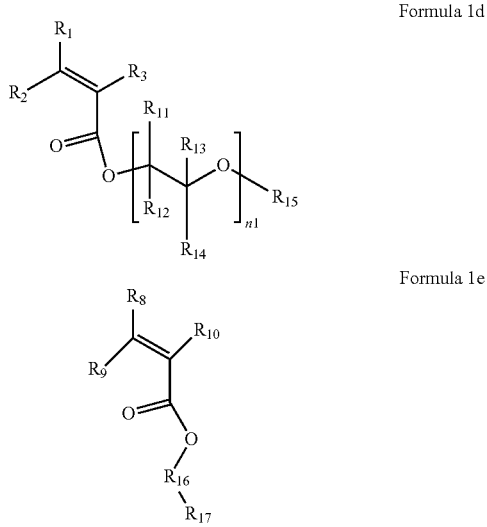

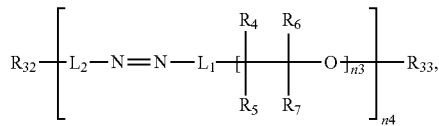

wherein, in Formula 1d to Formula 1f,
$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are each independently a hydrogen atom; a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen,
$R_{15}$ is a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen,
$R_{16}$ is a covalent bond; a linear or branched $C_1$-$C_{10}$ alkylene group that is unsubstituted or substituted with halogen; -($-R_a-O-$)$_k$-, wherein k is an integer of 2 to 100, and $R_a$ is a $C_2$-$C_{10}$ alkylene group that is unsubstituted or substituted with halogen; a $C_6$-$C_{10}$ cycloalkylene group that is unsubstituted or substituted with halogen; a $C_6$-$C_{10}$ arylene group that is unsubstituted or substituted with halogen; a $C_2$-$C_{10}$ heteroarylene group that is unsubstituted or substituted with halogen; or a divalent linking group comprising one or more of the foregoing groups,
$R_{17}$ is a halogen atom; a linear or branched $C_1$-$C_{10}$ alkyl group that is unsubstituted or substituted with halogen; a $C_6$-$C_{10}$ cycloalkyl group that is unsubstituted or substituted with halogen; a $C_2$-$C_{10}$ alkenyl group that is unsubstituted or substituted with halogen; a $C_2$-$C_{10}$ alkynyl group that is unsubstituted or substituted with halogen; a $C_6$-$C_{10}$ aryl group that is unsubstituted or substituted with halogen; or a $C_2$-$C_{10}$ heteroaryl group that is unsubstituted or substituted with halogen,
$R_{32}$ is a hydrogen atom, or a $C_1$-$C_{10}$ alkyl group,
$R_{33}$ is a $C_1$-$C_{10}$ alkyl group,
$L_1$ is a covalent bond or $-R_b-C(=O)-O-$, $L_2$ is a covalent bond or $-C(=O)-R_c-$, wherein $R_b$ and $R_c$, are each independently a linear or branched $C_1$-$C_{20}$ alkylene group, and
n1 is an integer of 2 to 100, n3 is an integer of 2 to 200, and n4 is an integer of 1 to 20.

* * * * *